US006656051B2

(12) United States Patent
Ishii et al.

(10) Patent No.: US 6,656,051 B2
(45) **Date of Patent: *Dec. 2, 2003**

(54) GAME PROGRESSION CONTROL METHOD, COMPUTER-READABLE RECORDING MEDIUM, AND GAME APPARATUS

(75) Inventors: Koichi Ishii, Tokyo (JP); Akihiko Matsui, Kanagawa (JP); Daisuke Fukugawa, Tokyo (JP)

(73) Assignee: Kabushiki Kaisha Square Enix, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/536,749

(22) Filed: Mar. 28, 2000

(65) Prior Publication Data

US 2002/0137557 A1 Sep. 26, 2002

(30) Foreign Application Priority Data

Sep. 30, 1999 (JP) .......................................... 11-279660

(51) Int. Cl.[7] ................................................ A63F 13/00

(52) U.S. Cl. ................................ 463/43; 463/1; 463/7; 463/8; 463/9; 463/36; 463/37; 463/44

(58) Field of Search ............................. 463/43, 36, 37, 463/38, 40, 41, 42, 44, 46, 47, 1, 2, 4, 7, 8, 9, 15, 23, 31; 273/108.1, 236, 237, 276, 440.1, 441, 460, 461

(56) References Cited

U.S. PATENT DOCUMENTS 4,504,055 A * 3/1985 Wells ....................... 273/85 G
4,655,451 A * 4/1987 Townsley ................. 273/32 H
4,858,930 A * 8/1989 Sato ......................... 273/85 G
5,146,557 A * 9/1992 Yamrom et al. ........ 395/161 X
5,319,548 A * 6/1994 Germain ................. 364/410 X
5,377,997 A * 1/1995 Wilden et al. .......... 273/434 X
5,390,937 A * 2/1995 Sakaguchi et al. .......... 273/434
5,577,185 A * 11/1996 Tunnell et al. .......... 395/173 X
5,601,487 A * 2/1997 Oshima et al. ............. 463/4 X
5,680,533 A * 10/1997 Yamato et al. .......... 395/173 X
5,805,784 A * 9/1998 Crawford ................ 395/173 X
5,807,173 A * 9/1998 Aoyama ...................... 463/23
5,886,697 A * 3/1999 Naughton et al. .......... 345/473
5,963,218 A * 10/1999 Naka et al. ................. 345/474
5,995,106 A * 11/1999 Naughton et al. .......... 345/854

(List continued on next page.)

FOREIGN PATENT DOCUMENTS

| | | |
|---|---|---|
| JP | 9-253333 | 9/1997 |
| JP | 2000107437 | 4/2000 |
| JP | 2000107441 | 4/2000 |
| JP | 2000157730 | 6/2000 |

OTHER PUBLICATIONS

Age of Empires: The Rise of Rome, Oct. 31, 1998, Ensemble Studios, Microsoft, all 22 pages.*
English Language Abstract of JP 9–253333.
English Language Abstract of JP 2000–107437.
English Language Abstract of JP2000–107441.

*Primary Examiner*—Teresa Walberg
*Assistant Examiner*—Binh-An D. Nguyen
(74) *Attorney, Agent, or Firm*—Greenblum & Bernstein, P.L.C.

(57) ABSTRACT

A game apparatus displays a world map, determines an arbitrary location within the displayed world map according to externally input operating information, obtains a terrain data set beforehand for the position determined within the world map and correlates a field map with the position determined within the world map. The game apparatus also obtains character data correlated with the field map that has been correlated with the position determined within the world map, and corrects the obtained character data based on the obtained terrain data. Thus, the field map and the enemy characters appearing in the field map are changed according to how the player plays the game.

15 Claims, 22 Drawing Sheets

601 605 604 602 603 606

MENU PROCESSING
S201 DISPLAY LIST OF MENU ITEMS
S203 CONFIRMED ITEMS?
LAND LAYOUT
SAVE
OTHER PROCESSING
CANCEL
S204 DISPLAY LIST OF ITEMS
S207 OBTAIN VARIOUS TYPES OF INFORMATION FROM MAIN MEMORY
RETURN
LAND LAYOUT ITEMS
S205 CONFIRMED ITEMS?
S208 SAVE TO MEMORY CARD
S206 LAND MAKING PROCESSING
CANCEL
S209 EXECUTE CORRESPONDING PROCESSING

U.S. PATENT DOCUMENTS 6,009,458 A * 12/1999 Hawkins et al. ........ 709/203 X
6,045,446 A * 4/2000 Ohshima ................... 463/2 X
6,045,447 A * 4/2000 Yoshizawa et al. ....... 463/31 X
6,123,619 A * 9/2000 Tokia et al. .............. 463/43 X
6,155,924 A * 12/2000 Nakagawa et al. ......... 463/4 X
6,160,551 A * 12/2000 Naughton et al. ...... 345/339 X
6,171,189 B1 * 1/2001 Katano et al. ............ 463/43 X
6,190,174 B1 * 2/2001 Lam ....................... 434/169 X
6,219,045 B1 * 4/2001 Leahy et al. ................ 345/757
6,227,973 B1 * 5/2001 Kikuchi .................... 463/31 X

* cited by examiner

| TERRAIN DATA TABLE | | | | | | | | |
|---|---|---|---|---|---|---|---|---|
| NO. | FIRE | WATER | EARTH | WIND | LIGHT | DARK-NESS | METAL | WOOD |
| 1 | 0 | 0 | 1 | 0 | 0 | 0 | 0 | 0 |
| 2 | 1 | 0 | 2 | 0 | 0 | 0 | 0 | 0 |
| ⋮ | ⋮ | ⋮ | ⋮ | ⋮ | ⋮ | ⋮ | ⋮ | ⋮ |

| ITEM TABLE | | | | | | | | | | |
|---|---|---|---|---|---|---|---|---|---|---|
| NO. | ITEM NAMES | FIRE | WATER | EARTH | WIND | LIGHT | DARK-NESS | METAL | WOOD | PRIMARY ATTRIBUTE |
| 1 | CAVE OF FOSSILS | 2 | 1 | 1 | 0 | 0 | 0 | 0 | 0 | FIRE |
| 2 | LOST WOODS | 1 | 0 | 2 | 0 | 0 | 0 | 0 | 0 | WOOD |
| ⋮ | | ⋮ | ⋮ | ⋮ | ⋮ | ⋮ | ⋮ | ⋮ | ⋮ | |

| CHARACTER TABLE | | | |
|---|---|---|---|
| CHARACTER | ENDURANCE | ATTACK | DEFENSE |
| MONSTER A | 85 | 100 | 120 |
| MONSTER B | 185 | 125 | 90 |
| MONSTER C | 100 | 80 | 145 |
| ⋮ | ⋮ | ⋮ | ⋮ |

| CHARACTER TABLE | | | | | | | | | | | | | | |
|---|---|---|---|---|---|---|---|---|---|---|---|---|---|---|
| CHARACTER | CAPABILITY VALUE DATA | | | CAPABILITY INCREASE DATA | | | ATTRIBUTES DATA | | | | | | | |
| | ENDU-RANCE | ATTACK | DE-FENSE | ENDU-RANCE | ATTACK | DE-FENSE | FIRE | WATER | EARTH | WIND | LIGHT | DARK-NESS | METAL | WOOD |
| MONSTER A | 85 | 100 | 120 | 5 | 1/2 | 3/4 | 1 | -1 | 1 | -1 | 0 | 0 | 0 | 0 |
| MONSTER B | 185 | 125 | 90 | 10 | 1/2 | 1 | 0 | 0 | 1 | 0 | 0 | 1 | 0 | -1 |
| MONSTER C | 100 | 80 | 145 | 7 | 1/4 | 1/2 | 1 | 0 | -1 | 0 | 0 | 0 | 1 | 0 |
| ........ | ........ | ........ | ........ | ........ | ........ | ........ | ........ | ........ | ........ | ........ | ........ | ........ | ........ | ........ |

| LEVEL CORRESPONDING RELATIONS TABLE | | | | | | |
|---|---|---|---|---|---|---|
| LEVEL REFERENCE VALUE | 1 | 2 | 3 | 4 | ······· | 63 |
| REFERENCE LEVEL | 1 | 1 | 2 | 3 | ······· | 99 |

| TERRAIN DATA TABLE | | | | | | | | | | | | |
|---|---|---|---|---|---|---|---|---|---|---|---|---|
| NO. | ATTRIBUTES DATA | | | | | | | | TERRAIN TYPE | | | |
| | FIRE | WATER | EARTH | WIND | LIGHT | DARK-NESS | METAL | WOOD | OCEAN | SEA-SHORE | PLAINS | MOUN-TAINS |
| 1 | 0 | 0 | 1 | 0 | 0 | 0 | 0 | 0 | 0 | 0 | 1 | 0 |
| 2 | 1 | 0 | 2 | 0 | 0 | 0 | 0 | 0 | 1 | 0 | 0 | 0 |
| .......... | .......... | .......... | .......... | .......... | .......... | .......... | .......... | .......... | .......... | .......... | .......... | .......... |

ITEM TABLE

| NO. | ITEM NAME | ATTRIBUTES DATA | | | | | | | | USABLE TERRAIN TYPE | | | |
|---|---|---|---|---|---|---|---|---|---|---|---|---|---|
| | | FIRE | WATER | EARTH | WIND | LIGHT | DARK-NESS | METAL | WOOD | OCEAN | SEA-SHORE | PLAINS | MOUN-TAINS |
| 1 | CAVE OF FOSSILS | 0 | 1 | 1 | 0 | 0 | 2 | 0 | 0 | 0 | 1 | 1 | 0 |
| 2 | LOST WOODS | 0 | 0 | 0 | 1 | 0 | 0 | 0 | 2 | 0 | 0 | 1 | 1 |
| .......... | .......... | .......... | .......... | .......... | .......... | .......... | .......... | .......... | .......... | .......... | .......... | .......... | .......... |

| LAND TABLE | | | | | | | | | | | |
|---|---|---|---|---|---|---|---|---|---|---|---|
| NO. | ITEM NAME | ATTRIBUTES DATA | | | | | | | | MAP PANEL NO. FOR PLACEMENT | ORDER OF PLACEMENT |
| | | FIRE | WATER | EARTH | WIND | LIGHT | DARK-NESS | METAL | WOOD | | |
| 1 | CAVE OF FOSSILS | 0 | 3 | 1 | 0 | 2 | 2 | 0 | 1 | 4 | 3 |
| 2 | LOST WOODS | 1 | 0 | 0 | 1 | 0 | 0 | 2 | 3 | 6 | 2 |
| ⋮ | ⋮ | ⋮ | ⋮ | ⋮ | ⋮ | ⋮ | ⋮ | ⋮ | ⋮ | ⋮ | ⋮ |

GAME PROGRESSION CONTROL METHOD, COMPUTER-READABLE RECORDING MEDIUM, AND GAME APPARATUS

BACKGROUND OF THE INVENTION

1. Field of the Invention

The present invention relates to a game control device for correcting an image (map) representing the contents of displayed objects on a background image and data such as characters placed on the map, and an information recording medium and game control method.

2. Description of the Related Art

The home video game apparatus has become commonplace in recent years, and video games played on such game apparatuses are now representative of easily-enjoyed entertainment, particularly with the younger generations. Various genres of games are being provided to the market, such as sports, fighting, dancing, and so forth. Particularly popular are RPGs (Role Playing Games) wherein a character operated by a player (hereafter referred to as "main character") moves through a virtual world, talking or fighting with other characters when specified conditions are satisfied, thereby causing the character to grow through these events, or simulating real-life wars, fights, human interaction, and so forth.

RPGs often involve the player operating an input device such as a controller, playing out the role of the main character by providing instructions to the main character, and thus progressing toward a provided target while experiencing adventure-like simulations.

With such RPGs, an image representing the entire world in the RPG (hereafter referred to as "world map") is displayed on the screen as a background image at the beginning of the game. The world map has images representing multiple destinations (hereafter referred to as "land") such as structures positioned at certain locations on the world map, and once the main character operated by the player reaches the land, the displayed background image is switched to an image (hereafter referred to as "field map") representing the inside of the structure represented by the land image.

Enemy characters, such as monsters and witches, are placed within the field map, and fighting commences in the event that the distance between the main character and the enemy character is less than a predetermined distance. The data to be set for enemy characters, such as bitmap, endurance, attack force, defense, etc., is stored in a CD-ROM beforehand, and the game apparatus reads out these definitions as appropriate from the CD-ROM and makes display thereof, thus carrying out fighting.

However, in the above arrangement, the data definitions of the enemy characters such as endurance, the place and type of enemy character to appear within the field map, and the position of the land placed within the world map, are all predetermined. Thus, when the player plays the same game the second time and subsequent times, the player experiences the same land layout and the same enemy character appearances. This has been a problem causing the player to lose interest in the game.

SUMMARY OF THE INVENTION

The present invention has been made in light of the above, and accordingly, it is an object of the present invention to provide a game progression control method, a recording medium recording game progression programs, and a game apparatus, wherein events occurring in the course of game progression can be changed according to arbitrary settings made by the player.

According to a first aspect of the present invention, a game progression control method for a video game is arranged such that items indicating positions of generation of events are placed within a map in which characters can be moved, in response to operation input; positional information of the position where an item was positioned within the map is stored each time an item is positioned; the character is moved within the map in response to operation input; in the event that the character moves to a position within the map where an item is positioned, the contents of an event to occur at the position to which the character has moved are determined according to the item obtained from the stored positional information and the positional relation with other items; and said determined event progresses.

With the first aspect of the present invention, items indicating the position where an event is to occur are placed in response to operation input, and the contents of an event to occur at the position of the item are determined according to the position of placement, so the contents of the event depend on where the player places the position for event generation.

According to a second aspect of the present invention, a computer-readable storage medium has programs for controlling game progression of the video game recorded therein, wherein the programs cause a computer to perform the following: placing items indicating positions of generation of events within a map in which characters can be moved, in response to operation input; storing positional information of the position where an item was positioned within the map each time an item is positioned; moving the character within the map in response to operation input; determining the contents of an event to occur at the position to which the character has moved according to the item obtained from the stored positional information and the positional relation with other items, in the event that the character moves to a position within the map where an item is positioned; and progressing with said determined event.

With this second aspect of the present invention, programs recorded on the recording medium are executed by the computer, so the game is carried out with the items indicating the position where an event is to occur being placed in response to operation input, and the contents of an event to occur at the position of the item being determined according to the position of placement. Thus, the contents of the event depend on where the player places the position for event generation.

According to a third aspect of the present invention, a game apparatus comprises: a computer for controlling game progression; and a storage medium recording programs for controlling game progression of a video game with the computer, wherein the programs cause a computer to perform the following: placing items indicating positions of generation of events within a map in which characters can be moved, in response to operation input; storing positional information of the position where an item was positioned within the map each time an item is positioned; moving the character within the map in response to operation input; determining the contents of an event to occur at the position to which the character has moved according to the item obtained from the stored positional information and the positional relation with other items, in the event that the character moves to a position within the map where an item is positioned; and progressing with said determined event.

With the game apparatus according to the third aspect of the present invention, items indicating the position where an event is to occur are placed in response to operation input, and the contents of an event to occur at the position of the item are determined according to the position of placement. Thus, the contents of the event depend on where the player places the position for event generation.

BRIEF DESCRIPTION OF THE DRAWINGS

FIG. 7 is a diagram illustrating an exemplary terrain data table stored in the terrain data area shown in FIG. 3;

FIG. 9 is a diagram illustrating an exemplary item table stored in the item area shown in FIG. 3;

FIG. 12 is a diagram illustrating an exemplary character data table stored in the character data area shown in FIG. 3;

FIG. 14 is a diagram illustrating an example of a character table stored in the character data area;

FIG. 15 is a diagram illustrating an example of a level corresponding relations table stored in the character data area;

FIG. 16 is a diagram illustrating an example of the terrain data table stored in the terrain data area;

FIG. 17 is a diagram illustrating an example of the item table stored in the item area;

FIG. 21 is a diagram illustrating an example of the land table; and

DETAILED DESCRIPTION OF THE PREFERRED EMBODIMENTS

First Embodiment

Figure 1:
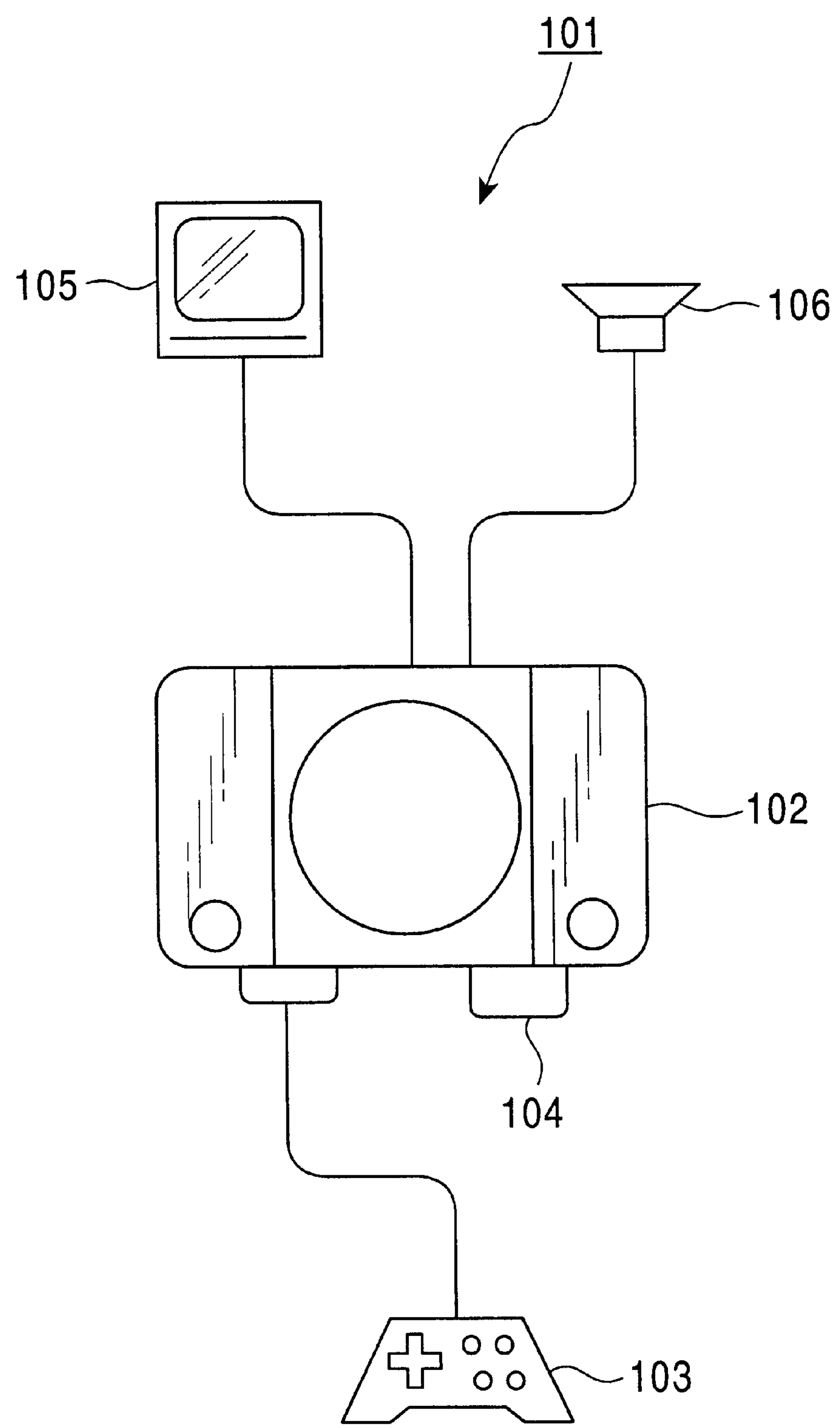
FIG. 1 is a diagram illustrating an external view of an exemplary game apparatus, according to the present invention.

FIG. 1 illustrates the overall configuration of an example game apparatus according to the present invention. The game apparatus 101 can be generally broken down in to a game apparatus main unit 102 which has the main functions of the game apparatus 101, a controller 103 for performing input of conducting operation instruction to the game apparatus main unit 102, a memory card 104 for storing game information by the game apparatus main unit 102, a monitor display 105 for displaying game contents by the game apparatus main unit 102, and a speaker 106 for outputting game audio by the game apparatus main unit 102.

Figure 2:
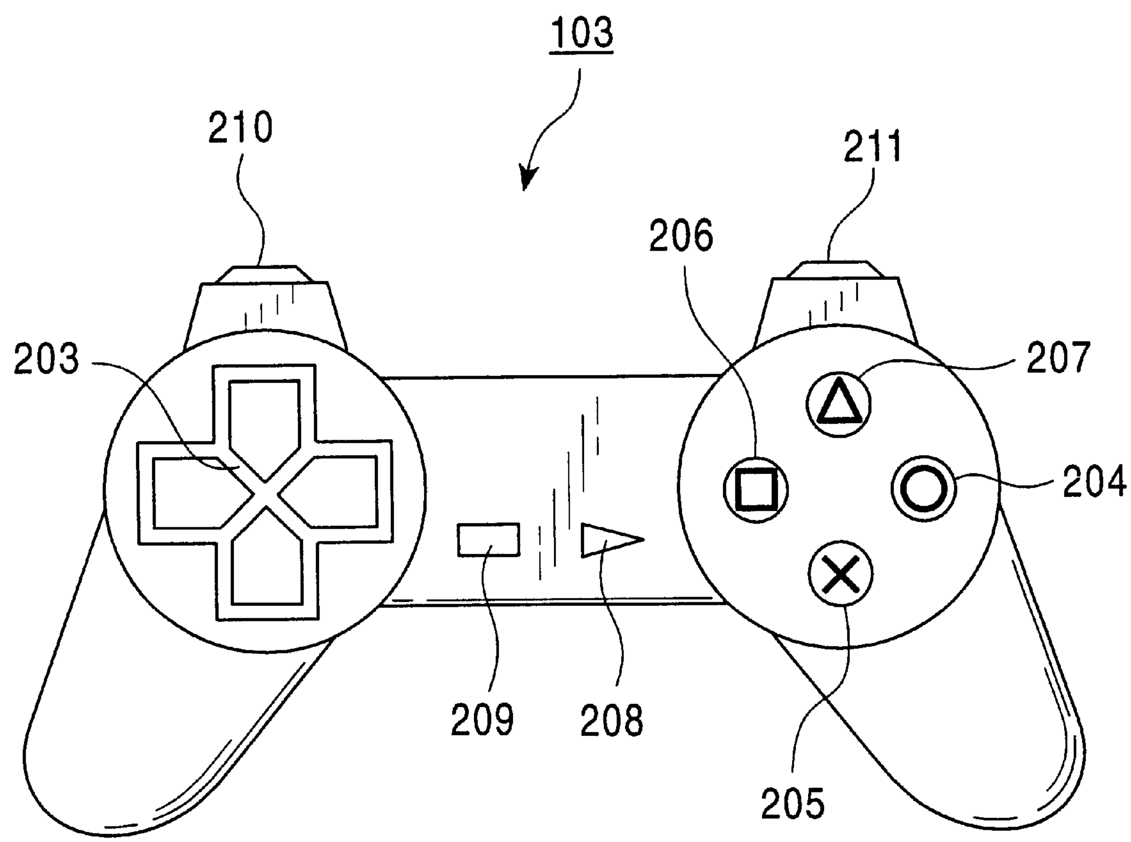
FIG. 2 is a diagram illustrating an example of an embodiment of the input device for the game apparatus shown in FIG. 1.

FIG. 2 illustrates an external view of an example of the controller 103 of the present invention. The components in FIG. 2 which are the same as those in FIG. 1 are denoted with the same reference numerals. Arrayed on the front plane of the controller 103 are a direction key 203, ○ button 204, x button 205, □ button 206, Δ button 207, start button 208, and select button 209, and in FIG. 2, provided on the upper side are an L1 button 210, R1 button 211, L2 button (not shown), and an R2 button (not shown). The direction key 203 includes an upper side, lower side, left side, and right side.

In the event that the world map or field map is displayed, the player operates the direction key 203 to instruct the main character to move. Also, in the case of fighting between the main character and an enemy character, the player operates the direction key 203 to move the cursor on a menu displayed on the screen displaying items such as attack, defense, escape, and so forth, and instructs execution of the item indicated by the cursor by pressing the ○ button 204.

Also, generally, the ○ button 204 is a key for instructing execution or confirmation, the x button 205 is for canceling, the Δ button 207 is for displaying menus, the start button 208 is for starting the game, and the select button 209 is for instructing switching to a game environment screen and the like. The other buttons such as the □ button 206, L1 button 210, and R1 button 211 are also appropriated with predetermined action instructions.

Figure 3:
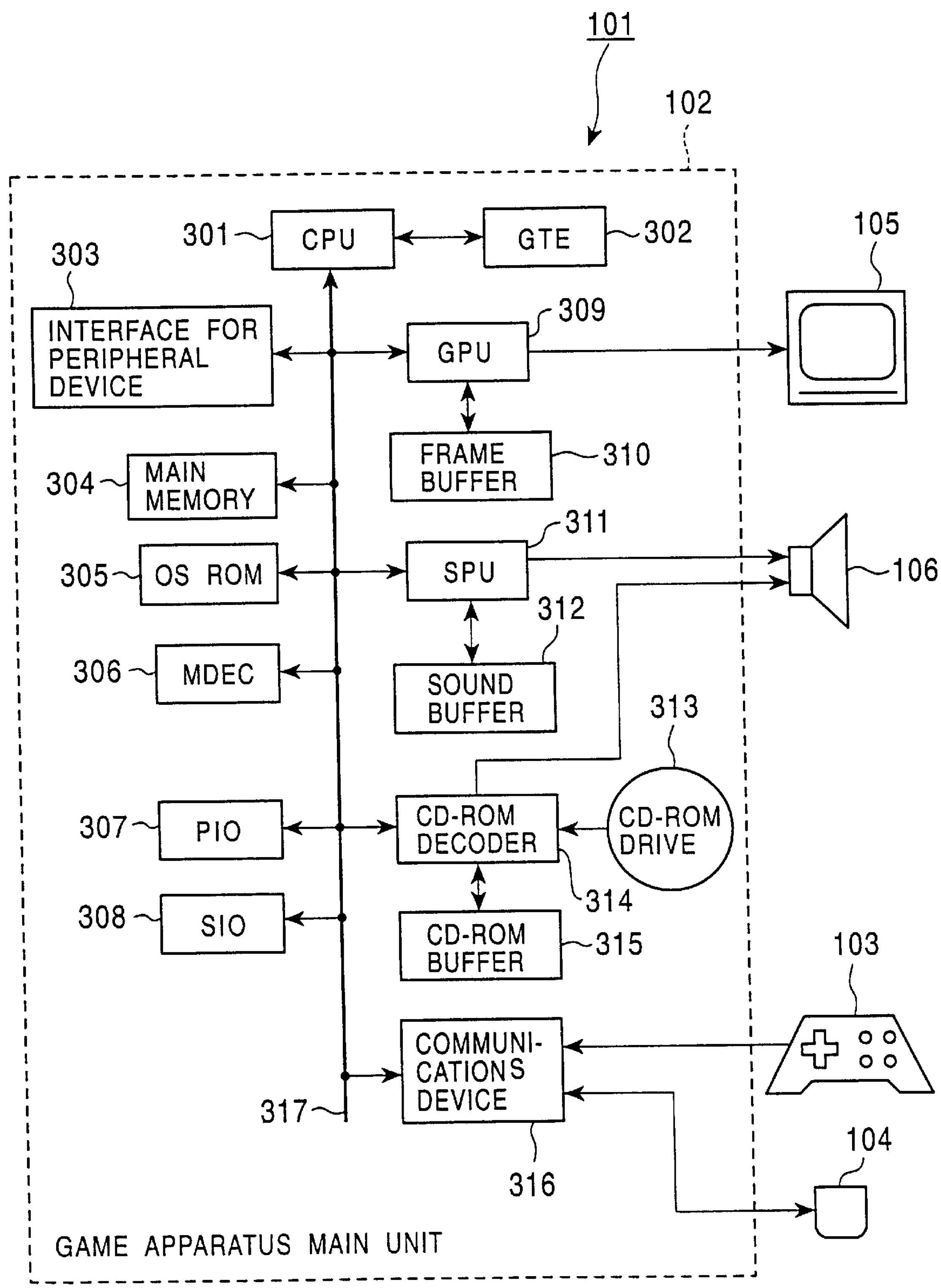
FIG. 3 is a block diagram illustrating an exemplary hardware configuration of the game apparatus shown in FIG. 1.

FIG. 3 is a block diagram illustrating an example of the circuit configuration of the game apparatus shown in FIG. 1. The components in FIG. 3 which are the same as those in FIGS. 1 and 2 are denoted with the same reference numerals.

The game apparatus 101 is made up of a CPU (Central Processing Unit) 301, a GTE (GeomeTric Engine (a graphic data generating processor)) 302, a peripheral device interface 303, main memory 304, OS-ROM (Operating System Read-Only Memory) 305, MDEC (Motion DECoder (a data expanding engine)) 306, PIO (Parallel Input/Output (an expansion parallel port)) 307, SIO (Serial Input/Output (an expansion serial port)) 308, GPU (Graphics Processing Unit (a graphics processing processor)) 309, frame buffer 310, SPU (Sound Processing Unit (a sound replay processing processor)) 311, sound buffer 312, CD-ROM drive 313, CD-ROM decoder 314, CD-ROM buffer 315, controller 103, memory card 104, and a communications device 316.

The CPU 301, peripheral device interface 303, main memory 304, OS-ROM 305, MDEC 306, PIO 307, SIO 308, GPU 309, frame buffer 310, SPU 311, CD-ROM decoder 314, and communication device 316, are mutually connected via the bus 317.

The GTE 302 is provided as a co-processor for the CPU 301, and performs computation processing of fixed-point matrix or vectors for coordinates conversion of light-source computation for 3-D images (polygon graphics) such as characters and background.

The peripheral device interface 303 has counter functions for performing time restriction, timing adjustment, etc., and interruption functions for input reception from the controller 103 and the like.

The main memory 304 is memory serving as work memory to which programs and data are temporarily stored, and the OS-ROM 305 is memory storing the Operating System.

The MDEC 306 performs calculation for inverse DCT (Discrete Cosine Transform), and decompresses data compressed with techniques such as JPEG (Joint Photographic Experts Group) and MPEG (Moving Picture Expert Group) readable from a CD-ROM mounted to the CD-ROM drive 313. Successively decompressing compressed data read from the CD-ROM allows moving picture processing to be realized by successive replaying of still images. The MDEC 306 is connected to the bus 317.

The GPU 309 is connected to the frame buffer 310, and is also connected to the monitor display 105 via bidirectional bus. The GPU 309 draws graphics on the frame buffer 310 based on the commands of the CPU 301, and outputs the drawn images to the monitor display 105 via the bi-directional bus. The frame buffer 310 is dedicated memory for drawing graphics, and images drawn here can be displayed on the image display device as is.

The SPU 311 is connected to the sound buffer 312, and is connected to the speaker 106 via an amplifier (not shown). The SPU 311 uses the ADPCM (Adaptive Differential Pulse Code Modulation) data stored in the sound buffer 312 as the sound source thereof, and plays audio signals at set sampling frequencies. The played sound signals are sent to the speaker 106 via the amplifier, thereby playing audio.

The CD-ROM drive 313 is mounted with a CD-ROM which stores recorded programs to be executed by the CPU 301. The CD-ROM decoder 314 reads necessary data from this CD-ROM to the main memory 304 as necessary.

Once the electric power is turned on to the game apparatus main unit 102, the CPU 301 reads a program called IPL (Initial Program Loader) into the main memory 304 based on the Operating System stored in the OS-ROM 305, and executes it. The IPL contains commands for reading programs recorded into the CD-ROM mounted on the CD-ROM drive 313 into the main memory 304, and shifting the control of the CPU 301 to the head of the program.

The controller 103 and memory card 104 such as shown in FIG. 1 can be connected to the communications device 316. This communications device 316 performs driving control of reading and writing of data to and from the memory card 104 based on control from the CPU 301, and transfers operating commands input from the player via the controller 103 to the CPU 301.

Incidentally, the memory card 104 is detachably mounted to the communications device 316, and is made up of non-volatile memory. Accordingly, even in the event that the memory card 104 is removed from the communications device 316, the internally-stored data (e.g., game data relating to the progress state of the game) can be held therein. Also, this memory card 104 may be configured of integrated circuits other than memory, such as a micro-processor or the like.

In order to use the game apparatus 1 having such a configuration, a CD-ROM with game programs recorded therein is set in the CD-ROM drive 313 shown in FIG. 3, and a power source button (not shown) of the game apparatus main unit 102 is turned on.

Thus, the game programs recorded in the CD-ROM set in the CD-ROM drive 313 are read out to the main memory 304 via the CD-ROM decoder 314, and the CPU 301 executes predetermined processing based on the programs.

Figure 4:
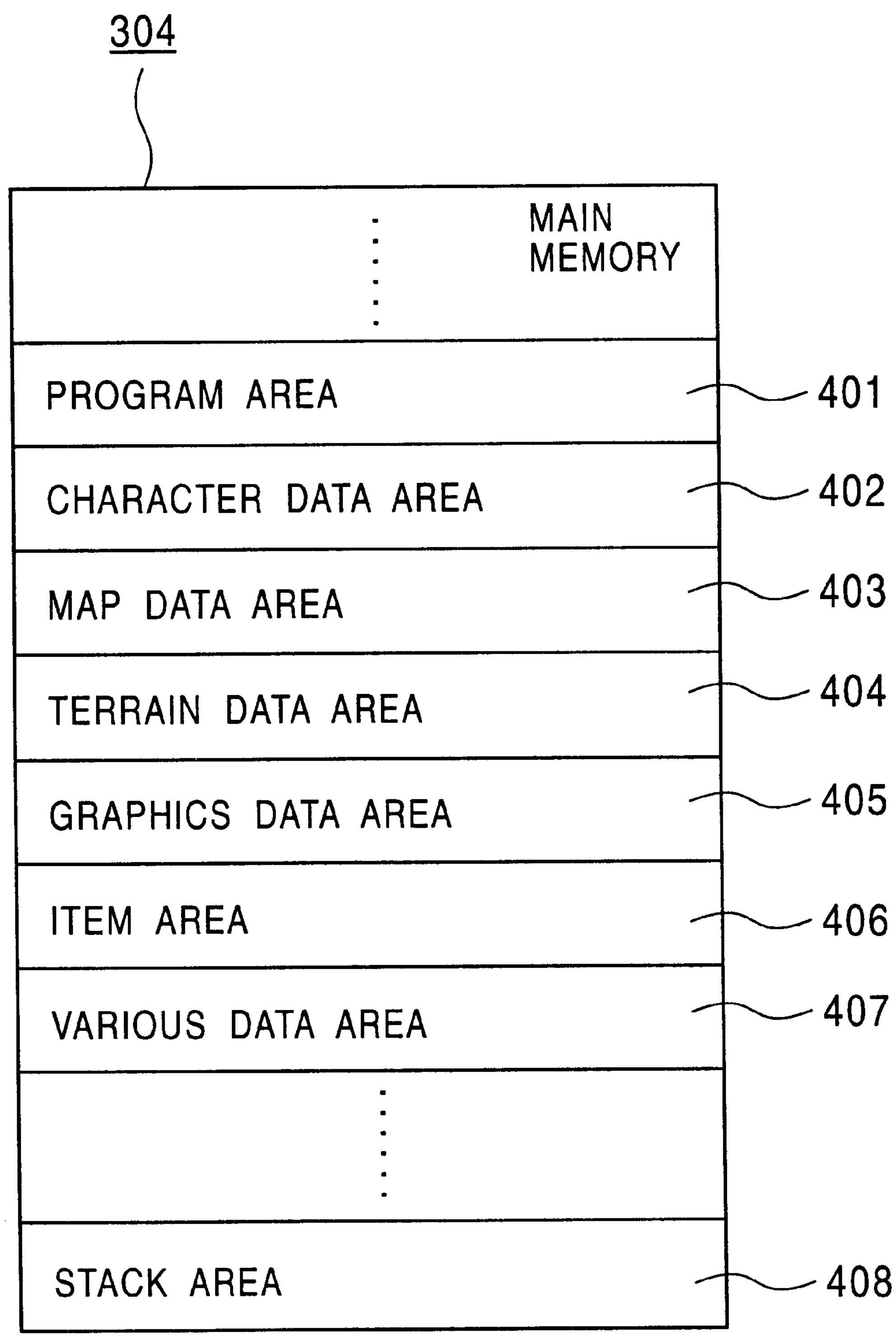
FIG. 4 is a diagram illustrating an example of the state of appropriation of the main memory area in FIG. 3.

FIG. 4 illustrates an overview of the various areas making up an exemplary main memory 304 in the present embodiment.

The main memory 304 has a program area 401 for storing programs to be executed by the CPU 301, a character data area 402 for storing data for the enemy characters and main character appearing on the field map such as endurance, attack, defense, and so forth, a map data area 403 for storing display images for displaying multiple map panels making up the world map on the screen, a terrain data area 404 for storing terrain data to be set on each of the map panels, a graphics data area 405 for storing image information of characters and objects to be placed on the map such as obstacles, an item area 406 for storing the ID (IDentifier) of the items which the main character has, names, and later-described attribute data, and a miscellaneous data area 407 for storing other data.

As shown in FIG. 7, a terrain data table 901A is prepared for the terrain data, and this is stored in the terrain data area 404. Four bits of integers (0 through 15) are appropriated to each of the eight types of attributes, "fire", "water", "earth", "wind", "light", "darkness", "metal", and "wood".

Further, a stack area 408 is secured for calling subroutines in the program and storing temporary values.

In the main memory 304, while the program area 401, character data area 402, map data area 403, terrain data area 404, graphics data area 405, item area 406, and miscellaneous data area 407 are used from low-order addresses up toward high-order addresses, the stack area 408 is used from high-order addresses down toward low-order addresses.

With the present embodiment, the CD-ROM mounted in the CD-ROM drive 313 functions as an information recording medium, the main memory 304 serves as positional relation storing means, and the CPU 301 cooperates with the main memory 304 to function as a detecting means and correcting means, and also cooperates with the controller 103 and GPU 309 as a destination placing means.

Incidentally, in order to facilitate ease of understanding, in the following descriptions, the processing performed by the CPU 301 will also include processing actually performed by the GTE 302, GPU 309, and SPU 311. Also, the processing programs are actually sequentially read from the CD-ROM mounted in the CD-ROM drive 313 according to the progression state of the processing under the control of the CPU 301 and transferred to the main memory 304, but in the following description, detailed description relating to reading transfer, and so forth will be omitted.

Next, example control processing procedures for the game apparatus 101 will be described with reference to FIGS. 5 through 13.

Figure 5:
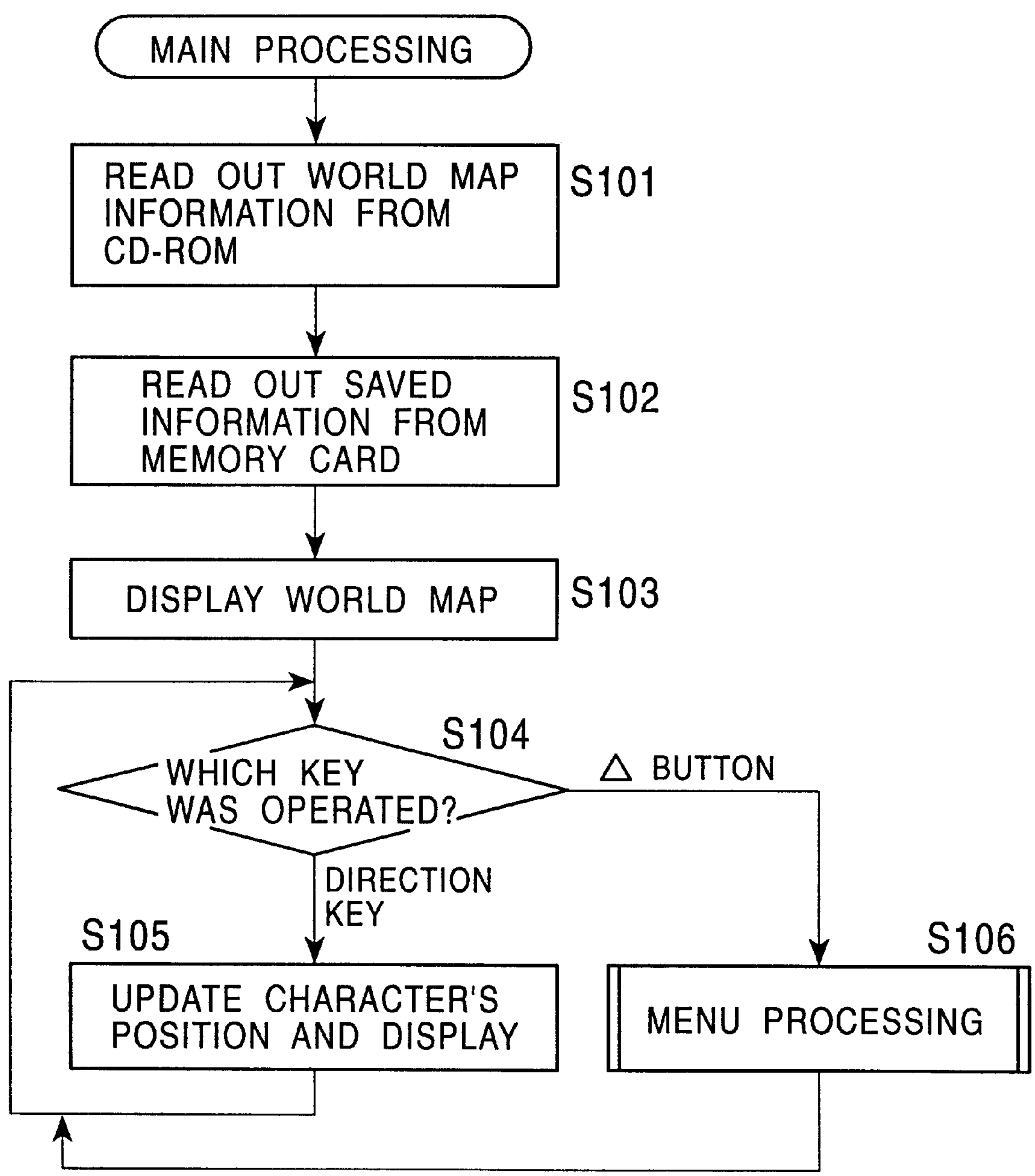
FIG. 5 is a flowchart illustrating an example of the main processing procedures in the embodiment of the present invention.

FIG. 5 is a flowchart illustrating an exemplary main processing flow of the game, according to a first embodiment of the present invention. Incidentally, the following processing is executed by the CPU 301 based on programs.

First, information for the world map is read out of the CD-ROM mounted in the CD-ROM drive 313, and is stored in the map data area 403 within the main memory 304 and the terrain data area 404 (step S101).

Next, information saved from playing the game before is loaded from the memory card 104 to the main memory 304 (step S102). Here, for example, information of the main character is stored in the character data area 402 and item area 406 in the main memory 304. Further, as described later, the map data area 403 may store information regarding in which map panels of the world map that land has been positioned, as well as the order in which it was placed.

Incidentally, in the case of playing for the first time, or in the event that the memory card 104 is not inserted, the default values are loaded to the main memory 304 from the CD-ROM mounted in the CD-ROM drive 313, in step S102.

Further, the world map is displayed on the monitor display 105 based on the information stored in the main memory 304 (step S103).

Figure 6:
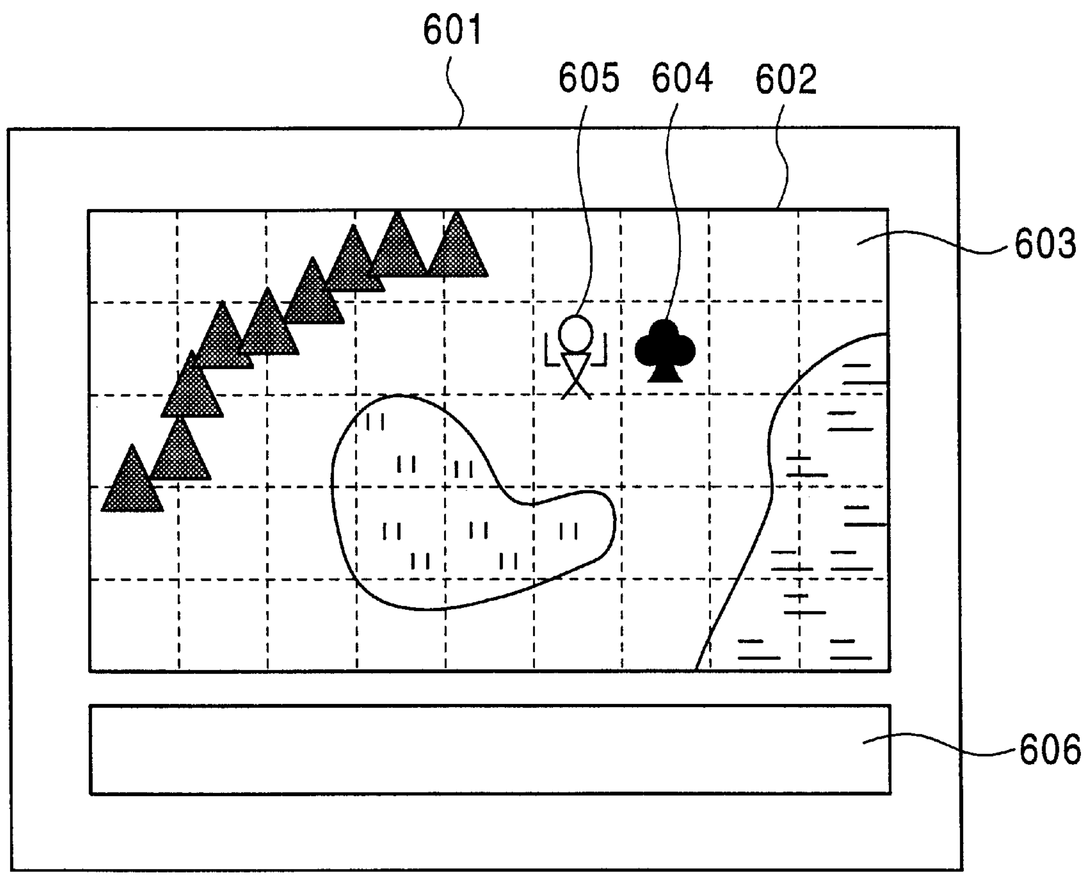
FIG. 6 is a diagram illustrating a display example with the image of a world map displayed on the monitor display of the game apparatus shown in FIG. 1.

FIG. 6 illustrates a display example of a work map image displayed on the display screen 601 of the monitor display 105 in step S103. In the present embodiment, a portion of the world map is clipped and displayed on the world map display area 602 of the display screen 601 of the monitor display 105. In the same manner, a message display area 606 is provided, and display of messages to the player is made here.

The world map is sectioned off in a grid-like form, and each square 603 is equivalent to a map panel. In this way, the world map is made up of multiple map panels 603.

As shown in FIG. 6, an image indicating a land such as a structure (hereafter referred to "land icon") 604 is positioned on the world map. Also, the player can move the main character 605 also placed on the world map by pressing the buttons and keys on the controller 103, and at the point that the main character 605 reaches the land 604, the display switches to a background image of the field map within the structure indicated by the land image.

In the world map, attributes for the map panels are set as appropriate; e.g., map panels displaying an ocean image have high "water" attribute values, map panels displaying a mountain image have high "earth" attribute values, and so forth.

The overall world map is made up of m by n map panels arrayed in m columns and n rows (wherein m and n are natural number) FIG. 7 illustrates the manner in which the terrain data is stored in the terrain data area 404 for each map panel.

A terrain data table 901A is stored in the terrain data storing area 404 in array fashion. This terrain data table 901A has m by n elements. A map panel placed at column x and row y has the attributes thereof stored in the map panel attributes area of the element No. x+(y×m).

Next, the flow waits for input from the player, and checks which keys or buttons on the controller 103 are being pressed (step S104). In the event that the player presses the direction key 203 (step S104; direction key), the position of the main character 605 is changed according to the direction of the direction key, the display position of the main character 605 is updated, display is made on the monitor display 105 (step S105), and the flow returns to step S104.

For example, in the event that the player presses the upper side of the direction key 203, the main character 605 displayed on the screen moves to the map panel adjacent to the current map panel at the upper side thereof. In the event that the world map is clipped, and the main character 605 is in the map panel displayed at the uppermost edge thereof, the world map is scrolled. Or, an arrangement may be made wherein the clipping area of the world map is changed each time the main character 605 is moved, so the main character 605 is always displayed in the center of the screen.

On the other hand, in the event that the player presses the D button 207 (step S104; D button), menu processing is executed (step S106) and the flow returns to step S104. Details of this menu processing will be described below.

Figure 8:
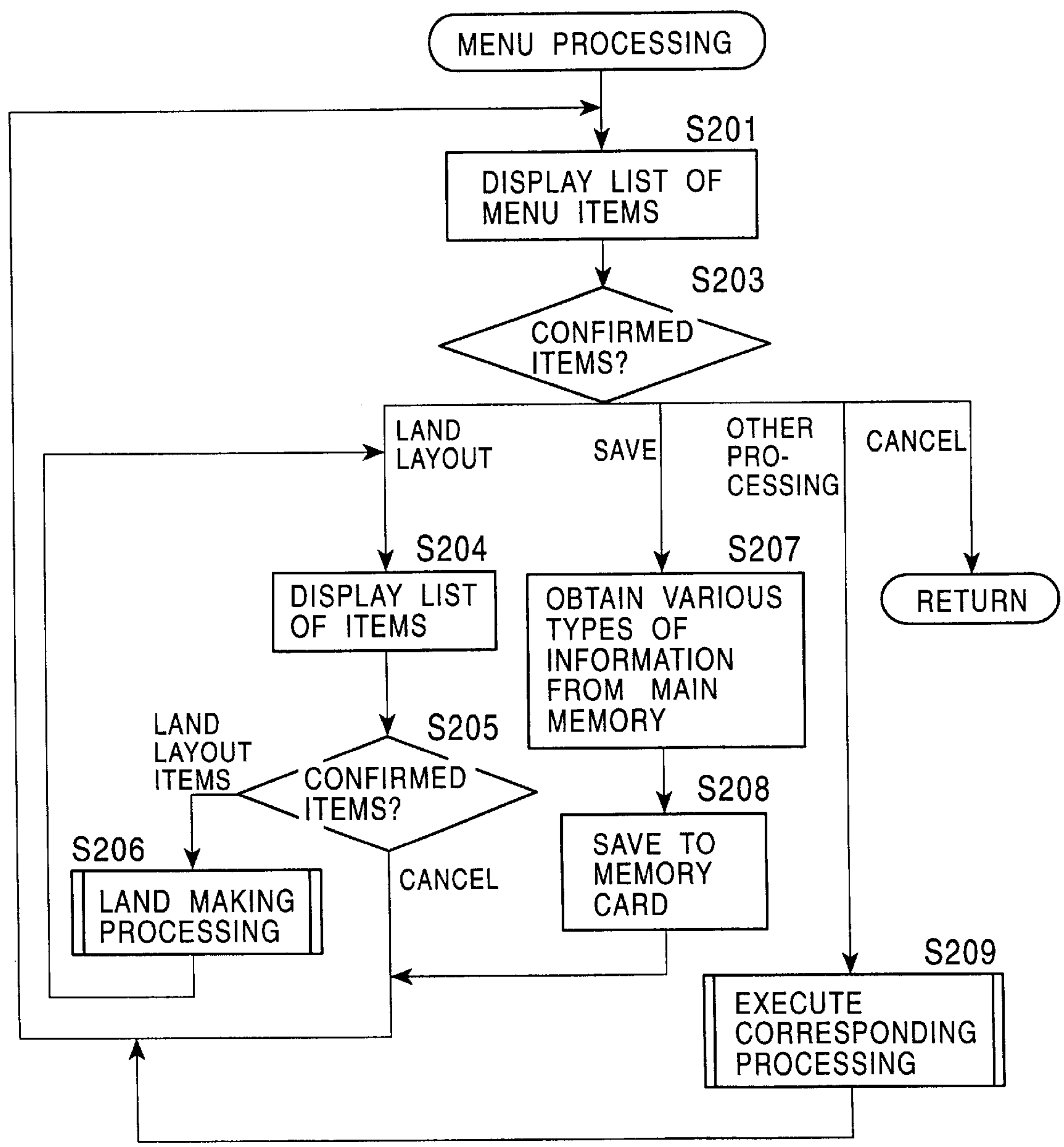
FIG. 8 is a flowchart illustrating an example of the menu processing procedures for FIG. 5.

FIG. 8 is a flowchart illustrating the menu processing in the first embodiment.

First, the menu screen is displayed, and input from the player is received (step S201). There are various items on the menu screen, and the player presses the direction key 203 so as to move the cursor to the desired item, following which the ○ button 204 is pressed to confirm the desired item. Also, in the event that the x button 205 is pressed, an item "cancel" which is not displayed on the screen is confirmed.

The flow checks which item the player has confirmed (step S203). In the event that the item confirmed by the player is "land layout" (step S203; land layout), the table 901B is searched from the item IDs stored in the item area 406 of the main memory 304, e.g., data such as the names of the items which the character currently has obtained, and these items are listed and displayed, and the flow receives input from the player (step S204).

In addition to weapons and protective items, there are items which allow lands to be positioned on the world map. FIG. 9 shows an exemplary item table 901B for storing a list of items capable of positioning land in the item area 406 of the main memory 304.

The item table 901B is represented as an array of elements for storing item attributes. Elements corresponding to items include the item name area for storing the name of the land to be positioned by that item, the item attributes area for storing each of the attributes of the items capable of positioning land, and the item main attributes area for storing the main attributes of the item.

As with the map panels, eight attributes are appropriated to each of the lands. Also, one of the eight attributes is assigned to each land as the main attribute thereof. For example, the name of the first item is "cave of fossils", with the "fire" attribute having a value of 2, the "water" and "earth" attributes having values of 1 each, and the other attributes are 0, so the main attribute is "fire".

The process for selecting one of the listed items is the same as the process for selecting an item from the menu.

Further, the flow checks which item the player has confirmed (step S205). In the event that "cancel" has been confirmed (step S205; cancel), the flow immediately returns to step S201.

In the event that the items which can position land on the world map are confirmed (step S205; item), the land making processing for positioning land on the world map based on the confirmed items is executed (step S206). The land making processing will be described in detail later.

When the land making processing has been completed, the flow returns to step S204 in order to allow the player to confirm items again. Thus, multiple lands can be placed on the world map.

On the other hand, in the event that the item confirmed by the player is "save" (step S203; save), data relating to the endurance, attack, defense, etc., of the main character is obtained from the character data area 402 in the main memory 304, the types of items held by the main character are obtained from the item area 406, which land is placed on which map panel of the world map, and in which order the lands have been placed, is obtained from the map data area 403 of the main memory 304, respectively (step S207).

Next, the obtained data is saved in the memory card 104 (Step S208), and the flow returns to step S201.

In the event that the item confirmed by the player is "cancel", (step S203; cancel), the present processing is quit and the flow returns to the main processing.

In the event that the item confirmed by the player is any other item (step S203; other), the corresponding processing is executed (step S209), and the flow returns to step S201. Incidentally, description of the details of processing corresponding to the other items will be omitted.

Figure 10:
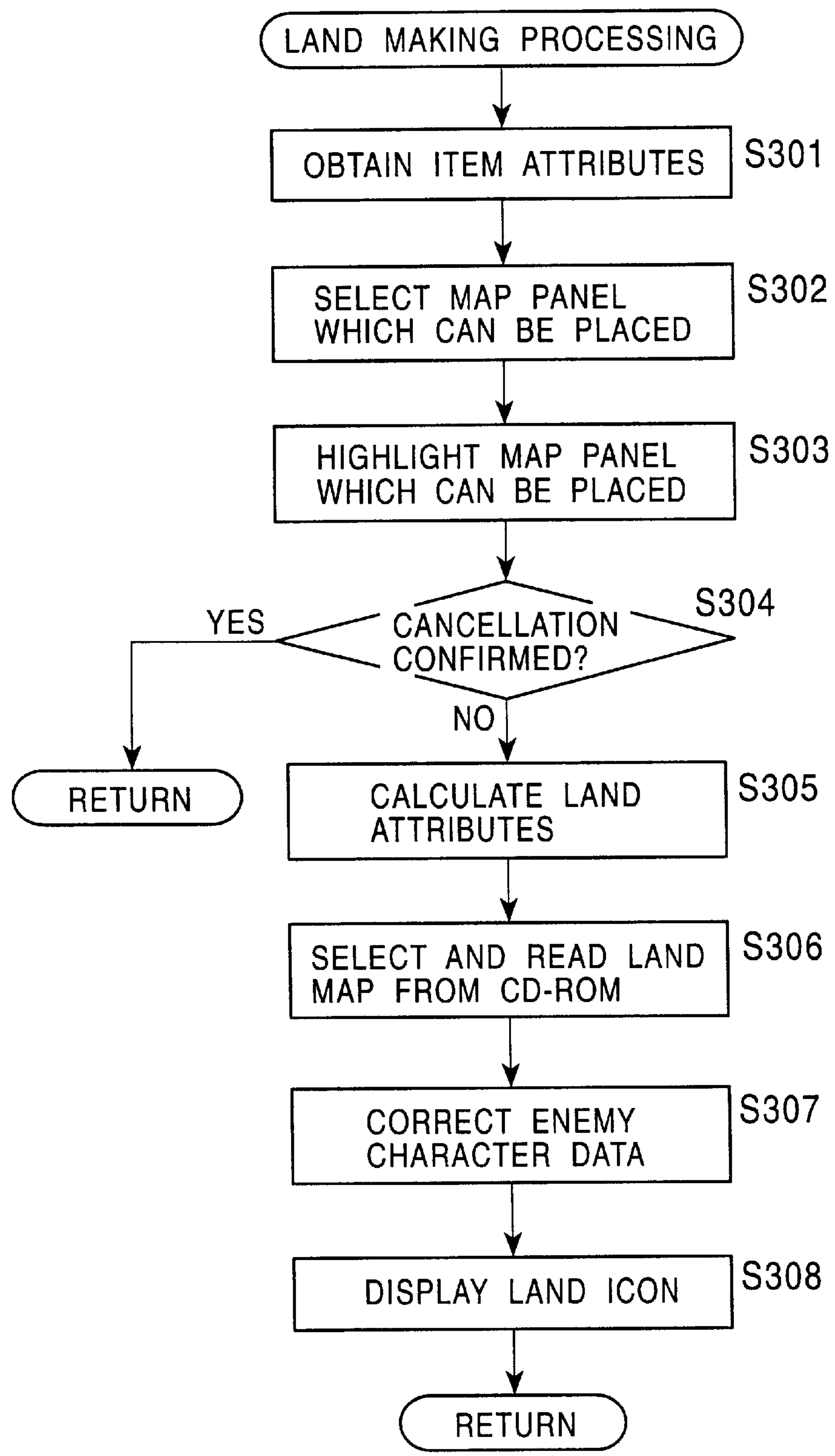
FIG. 10 is a flowchart illustrating an example of the land making processing procedures for FIG. 8.

FIG. 10 is a flowchart illustrating the land making processing.

First, the eight types of attributes of the item determined in step S205 and the main attribute thereof is obtained from the item area 406 of the main memory 304 (step S301).

Next, a map panel to which land can be placed with this item is selected (step S302). In the present embodiment, map panels to which land can be placed are determined by the following conditions:

(a) That no land has been placed there yet.

(b) That land has been placed in one of the adjacent map panels.

(c) That each of the eight type of attributes of the item have values greater than the attributes corresponding to the map panel.

The CPU judges whether or not each of the map panels making up the world map satisfies the above conditions, and the judgement results for each are temporarily stored in the miscellaneous data area 407 within the main memory 304, thereby selecting the step S302.

The judgement results can be represented with one bit for whether or not placement can be made, so an m by n bit string bit array is prepared in the miscellaneous data area 207 within the main memory 304, and the judgement results are represented by setting or clearing each bit in this array.

For example, the first element for the terrain data table 901A shown in FIG. 7 shows the attributes of the map panel at Column No. 1 Row No. 1, where the "earth" attribute is 1 and all other attributes are zero. Accordingly, in the event that the item of the first element in the item table 901B shown in FIG. 9 is determined in step S205, the above condition (c) is satisfied, so in the event that there has not yet been land placed in the Column No. 1 Row No. 1, and there is land placed in either Column No. 2 Row No. 1 or Column No. 1 Row No. 2, the above conditions (a) and (b) are also satisfied.

Next, reference is made to the bit string in the miscellaneous data area 407 which stores the judgement results from step S302, map panels to which land placement can be made are highlighted, and input from the player is input (step S303).

Figure 11:
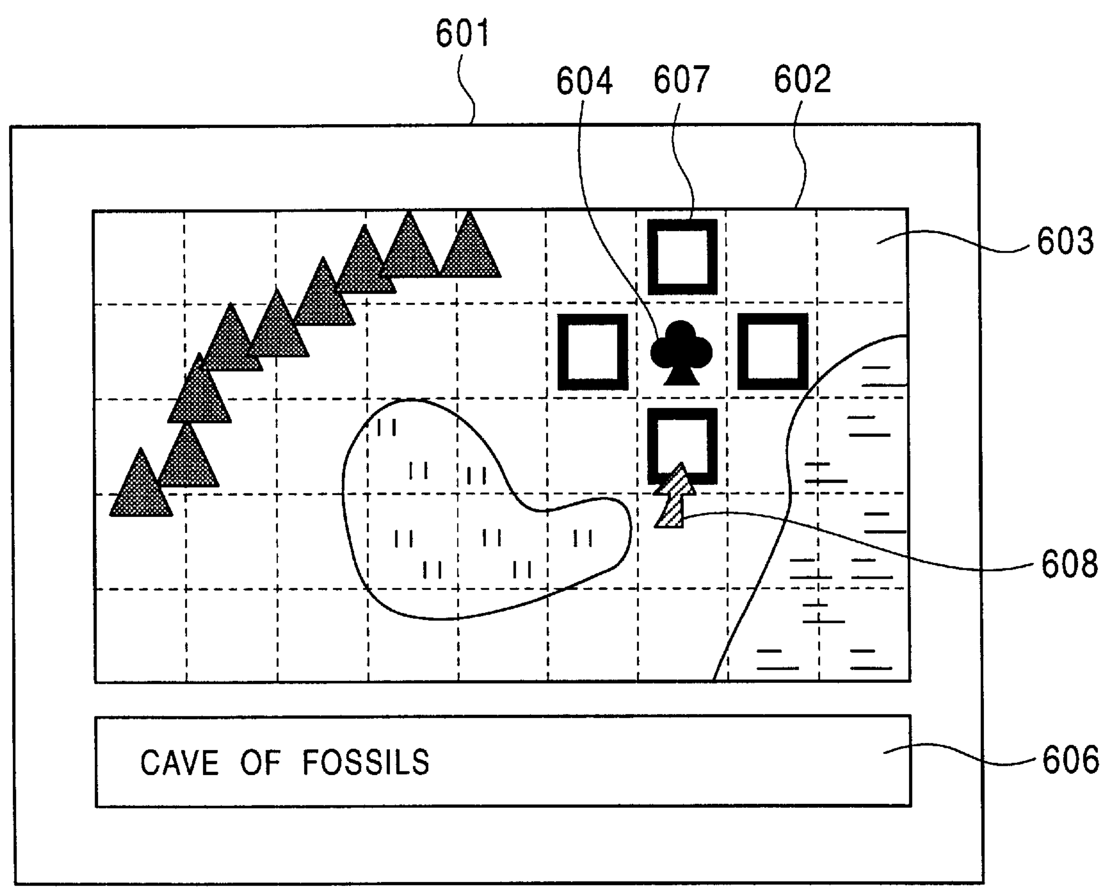
FIG. 11 is a diagram illustrating a display example with the image of a world map in the land making processing procedures displayed on the monitor display.

FIG. 11 illustrates an example of a screen display in the event that map panels to which land placement can be made are highlighted.

The name of the currently confirmed item, "cave of fossils", is displayed on the message display area 606 toward the bottom of the screen.

Four highlighting shapes 607 for displaying the map panels to which new lands can be placed in a highlighted manner are displayed around the land icon 604 within the world map display area 602.

Further, a cursor 608 for instructing to which of these four map panels displayed by the highlighting shapes 607 land is to be placed, is displayed.

The player pressing the direction key 203 of the controller 103 moves the cursor 608 among the highlighting shapes 607, pressing the ○ button confirms the map panel which the cursor 608 is currently at, and pressing the x button confirms "cancel".

Next, whether or not the player has confirmed "cancel" in step S303 is checked (step S304), and in the event that "cancel" has been confirmed (step S304; YES), the present processing is quit and the flow returns to the menu processing.

On the other hand, in the event that one of the map panels has been confirmed (step S304; NO), attributes similar to those of the map panel to be correlated to the land to be placed (hereafter referred to as "land attributes") are calculated (step S305). Calculation of land attributes is performed as follows.

First, the eight attributes for the terrain data of the map panel are obtained from the terrain data table 901A, and the eight attributes for the item are obtained from the item table 901B.

Next, regarding each of the eight attributes of terrain data of the map panel, addition is made to the corresponding attributes of the item, and further, subtraction is made to the value of antipodal attributes of the item. For example, in the event that the "fire" attribute of the terrain data of the map panel is 1, the corresponding attribute "fire" of the item is increased by 1, and the antipodal attribute "water" of the item is decreased by 1. Such adding and subtracting is repeated for each of the eight attributes of the map panel.

There are four sets of antipodal attributes; "fire" and "water", "earth" and "wind", "light" and "darkness", and "wood" and "metal".

The values thus obtained for the eight attributes are set as the land attributes for the land to be set.

Further, based on the calculated land attributes, a field map corresponding to the land is selected and read from the CD-ROM mounted on the CD-ROM drive 313, and stored in the map data area 403 in the main memory 304 (step S306).

That is to say, multiple field maps are prepared beforehand for each item, and the field map to be displayed is determined according to the land attributes.

The following methods may be used for example, for selecting which to pick from multiple field maps.

Check which No. attribute of the eight attributes of the obtained land attributes has the greatest value, and select the field map of that No.

Compare the eight attributes of the obtained land attributes with the original eight attributes, check which No. attribute of the eight attributes has increased the most, and select the field map of that No.

Using such a method also reduces the amount of capacity necessary when saving the game partway through in the memory card 104.

Next, the data of the character corresponding to the placed land is read out from the CD-ROM mounted on the CD-ROM drive 313 and stored in the character data area 402, and further, the data of enemy characters which appear in the land is corrected based on the main attributes of the item and the calculated land attributes (step S307).

FIG. 12 shows an example of the character data table 901C for storing enemy character data in the character data area 402 within the main memory 304.

This character data table 901C has been stored in a manner correlated with the land called "cave of fossils", and enemy characters monster A, monster B, monster C, and so on appear. Elements that are prepared for storing the data for the enemy characters are the endurance area 1001 for storing endurance, the attack area 1002 for storing attack force, and the defense area 1003 for storing defense force.

The enemy character data can be corrected as follows.

For example, in the event that the main attribute of the item is "fire", the calculation is made regarding the amount of change $\Delta$ in the "fire" attribute out of the calculated land attributes, to see how much change there has been in comparison with the "fire" attribute of the original item.

Next, $\Delta/I$ (wherein I is an arbitrary constant) is added to the endurance, attack, and defense of the enemy character. That is, in the event that $\Delta$ is positive, correction is made such that the capabilities of the enemy character increase, and in the event that $\Delta$ is negative, correction is made such that the capabilities of the enemy character decrease.

Thus, the enemy character data stored in the endurance area 1001, attack area 1002, and the defense area 1003 is corrected.

Finally, a land icon representing the placed land is displayed on the map panel where the land has been placed (step S308), the present processing is ended, and the flow returns to the menu processing.

Figure 13:
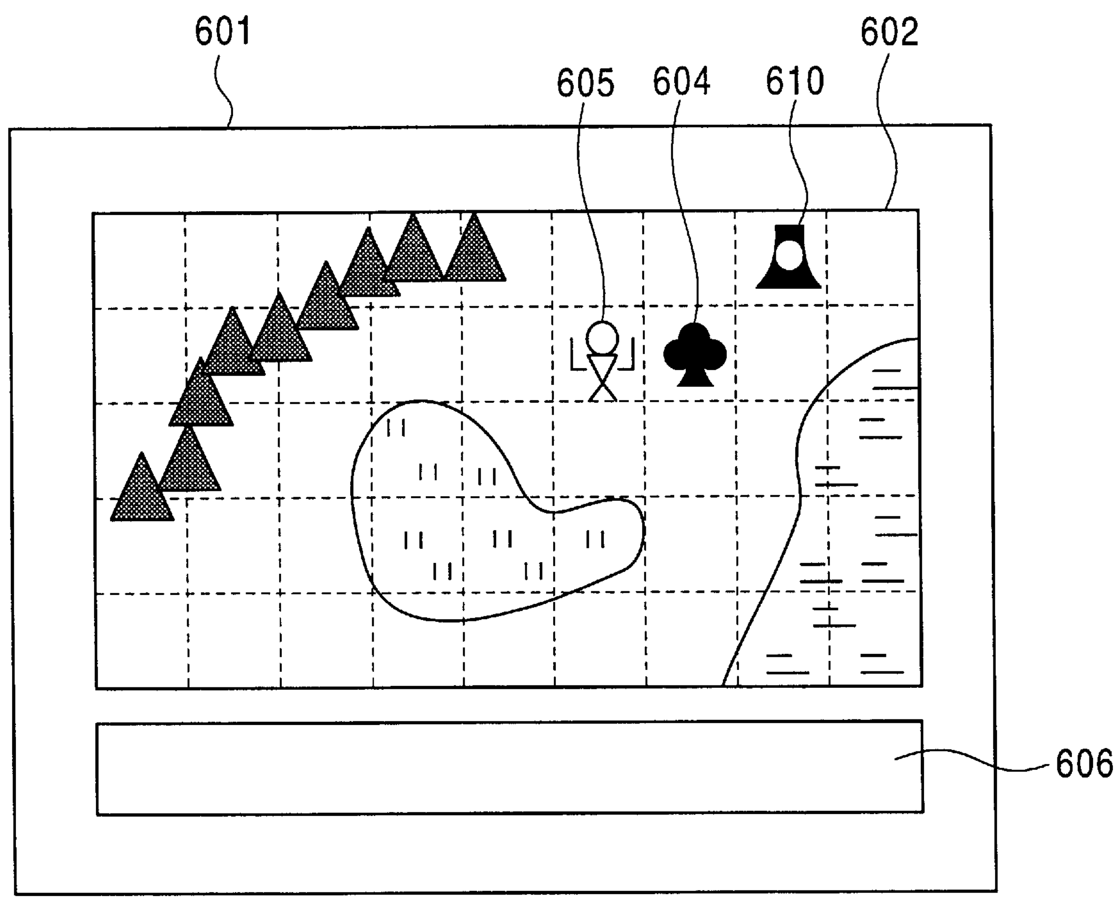
FIG. 13 is a diagram illustrating a display example with the image of a world map following completion of the land making processing shown in FIG. 10, displayed on the monitor display.

FIG. 13 illustrates an example of a screen display in the event that a land icon 610 of a new land positioned in step S308 has been displayed.

According to the above configuration, in the first embodiment, the player can place lands on arbitrary positions on the world map. Also, the display of field maps which are maps within the land, can be changed according to the place on the world map where the placement has been performed. Further, the capabilities of the enemy characters positioned on the field map can be changed according to the position at which they are placed.

Second Embodiment

The configuration of the second embodiment is generally the same as that of the first embodiment. With the second embodiment, the order in which lands are placed is stored, and the data of the enemy character obtained at step S307 of the first embodiment is further corrected according to the number in order in which the land was placed.

For example, in the event that the land to be placed this time is land No. N, the endurance, attack, and defense of the enemy character are each increased by N×j (wherein j is an arbitrary constant) percent.

In this case, the main character experiences many fights in order to gather many items, and the greater the endurance, attack, and defense data of the main character are, the more lands can be laid. Accordingly, with this correction method, the enemy characters can be made more powerful according to the progression state of the game.

Further, with the present game, one land is set in the world map at the time of starting the game for the first time. This first land is called a base land. Exploring the field map of this base land yields new items, and these items are used to set new lands.

The data of the enemy character is corrected according to the distance L between the newly placed land and the base land. For the distance between the land and the base land, the difference in rows between the two and the difference in columns between the two can be used, for example. For example, in the event that the base land is at Row No. 1 and Column No. 8, and the position for setting the new land is at Row No. 3 and Column No. 2, the distance between the two can be calculated in units of map panels by $|3-1|+|2-8|=8$.

Once the distance L is determined, the enemy character data is corrected accordingly. For example, the endurance, attack, and defense of the enemy character are each increased by L×k (wherein k is an arbitrary constant) percent.

With the present game, the main character experiences many fights in order to gather many items, and the greater the endurance, attack, and defense of the main character are, the farther from the base land the main character can place new lands. Accordingly, with this correction method, the enemy characters placed on the field map can be made more powerful according to the progression state of the game.

According to the above configuration, with the second embodiment, in addition to the advantages of the first embodiment, the capabilities of the enemy characters can be corrected according to the order of placing the lands and distance from the base point of the game to a destination, thus matching the capabilities of the enemy characters with the progression of the game.

Third Embodiment

The hardware configuration of the game apparatus for realizing the third embodiment is the same as that shown in FIGS. 1 through 3.

Also, as with the first embodiment shown in FIG. 4, the main memory 304 in the third embodiment comprises a program area 401, character data area 402, map data area 403, terrain data area 404, graphics data area 405, item area 406, and a miscellaneous data area 407 for storing other data.

Of the storage areas provided within the main memory 304, the data stored in the character data area 402, terrain data area 404, and item area 406, differs from that in the first embodiment. The following is a description of data which differs from that in the first embodiment.

FIG. 14 illustrates an example of the character table 910 stored in the character data area 402. This character data table 910 stores character names, capability value data, capability increase data and attributes data, in a mutually corresponding manner.

The names of the enemy characters appearing in the game are set in the character name. Data representing the capability values of the enemy character are registered to the capability value data in subsections of endurance, attack, and defense. The greater each of the capability values are, the higher the capabilities are of the corresponding enemy character. In the example shown in FIG. 14, the capabilities of "monster A" are set to endurance "85", attack "100", and defense "120".

Data indicating how much to increase the capability value data each time the level of each character rises is set in the capability increase data. In the example shown in FIG. 14, for "monster A", the amount of increase in capabilities for endurance is set at "5", the amount of increase in capabilities for attack is set at "½", and the amount of increase in capabilities for defense is set at "¾".

Set to the attribute data portion is data indicating which attributes of the land the enemy character is affected by, for each of the eight attributes "fire", "water", "earth", "wind", "light", "darkness", "metal", and "wood". The attributes data is represented by values of "0", "1", and "−1". "0" indicates an attribute wherein there are no effects from the land.

"1" indicates a strengthening attribute. A strengthening attribute is an attribute which exhibits effects of effecting the enemy character from the land and increasing the capability values of the enemy character. "−1" indicates a weakening attribute. A weakening attribute is an attribute which exhibits its effects of effecting the enemy character from the land and lowering the capability values of the enemy character.

In the example in FIG. 14, the strengthening attributes for the "monster A" are "fire" and "earth", and the weakening attributes are "water" and "wind". Accordingly, the greater the total value of "fire" attributes and "earth" attributes on the land where the "monster A" has appeared is, the higher the capabilities set for the "monster A" are. Conversely, the greater the total value of "water" attributes and "wind" attributes on the land where the "monster A" has appeared is, the lower the capabilities set for the "monster A" are.

The character data area 402 further stores a level correlating relation table. FIG. 15 shows an example of the level correlating relation table 915. Set in the level correlating relation table 915 are the correlated relation between a level reference value and a reference level. For example, if the level reference value is 1, the reference level also is 1. Also, if the level reference value is 63, the reference level is 99.

At the time of calculating the capability value of the enemy character within the land, the level reference value is calculated first. The level reference value is a value obtained by multiplying the distance between the first land (base land) and the object land by the order in which that land appeared.

Then, the reference level corresponding to the obtained level reference value can be obtained by making reference to the level correlating relation table 915.

In the event that an enemy character has appeared within a certain land, the capability level at the time of the enemy character appearing is determined by performing a predetermined calculation using the reference level value and a value representing the degree of effects imposed by the attribute values of the land. The capability values of the enemy character are changed according to the determined capability levels.

FIG. 16 illustrates an example of the terrain data table 920 stored in the terrain data area 404. The terrain data table 920 stores the map panel No. and setting item to be set for attributes data and terrain type. The map panel No. is a serial number given to the map panels making up the world map.

Incidentally, in the event that the world map is divided up in a grid-like form, a map panel is each area thereof. In the event of placing an item for creating a land, one item is placed per map panel.

The attribute values provided to the map panels are set for each of the eight types of attributes, "fire", "water", "earth", "wind", "light", "darkness", "metal", and "wood". In the example shown in FIG. 16, the attribute value for "earth" is set to 1, and the other attribute values are set to zero.

For the terrain types, setting areas are provided for each of the four types of terrain types, "ocean", "seashore", "plains", and "mountains". A "1" is set for the terrain type for the map panel, and "0" is set to the other terrain types. In the example shown in FIG. 16, the terrain type "plains" has been set for the map panel "No. 1".

FIG. 17 shows an example of an item table 930 stored in the item area 406. The item table 930 stores the item No., item name, attributes data, and usable terrain type to which it can be placed.

A serial No. provided to the item for generating the land on the world map is set for the item No.

The name of the item corresponding to the item is registered to the item name. In the example shown in FIG. 17, the name "cave of fossils" is set to the item No. "No. 1".

The attribute values provided to the corresponding item are set for the attributes data, for each of the eight attributes, "fire", "water", "earth", "wind", "light", "darkness", "metal", and "wood". In the example shown in FIG. 17, the item with the name "cave of fossils" has an attribute value of 1 for "water", an attribute value of 1 for "earth", an attribute value of 2 for "darkness", and other attribute values are zero.

As for the usable terrain type, setting areas are provided for each of the four terrain types, "ocean", "seashore", "plains", and "mountains". For terrain types of the map panels wherein the corresponding item can be placed, "1" is set for the usable terrain type, and for terrain types of the map panels wherein the corresponding item cannot be placed, "0" is set thereto. In the example in FIG. 17, "1" is set for the terrain types "seashore" and "plains" for the item whose name is "cave of fossils", and "0" is set for the terrain types "ocean" and "mountains". This means that the item whose name is "cave of fossils" can only be placed on map panels with terrain types of "seashore" or "plains".

Next, example game processing procedures according to the third embodiment will be described. Incidentally, the processing described below is processing which is carried out by the CPU 301 cooperating with other devices based on the programs read from the CD-ROM mounted on the CD-ROM drive 313 and transferred to the main memory 304.

Figure 18:
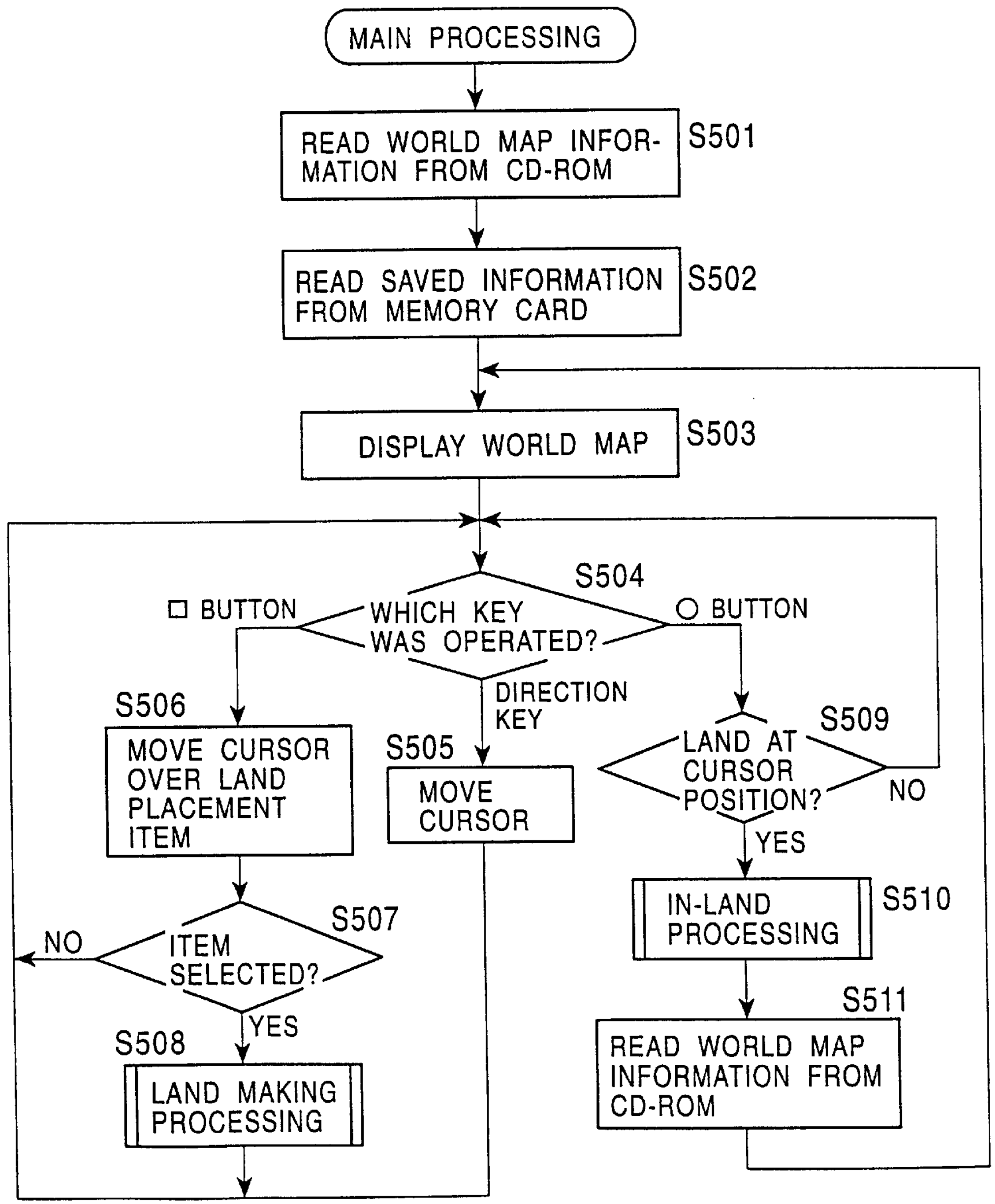
FIG. 18 is a flowchart illustrating exemplary main processing procedures, according to a third embodiment.

FIG. 18 is a flowchart illustrating exemplary main processing procedures for the third embodiment. First, world map information is read out from the CD-ROM mounted on the CD-ROM drive 313. The image information of the world map in the read information is stored in the map data area 403 within the main memory 304. Of the read information, data such as the attributes for each map panel and the terrain types thereof are stored in the terrain data area 404 (step S501).

Next, the information saved from the previous time the game was played is loaded from the memory card 104 to the main memory 304 (step S502). Thus, the main character information at the point of saving the previous time is stored in the character data area 402 within the main memory 304. Also, the land placement information at the point of saving the game the previous time is stored in the map data area 403.

Once the loading processing of the saved data is completed, the world map is displayed on the screen on the monitor display 105, based on the information stored in the main memory 304 (step S503).

Figure 19:
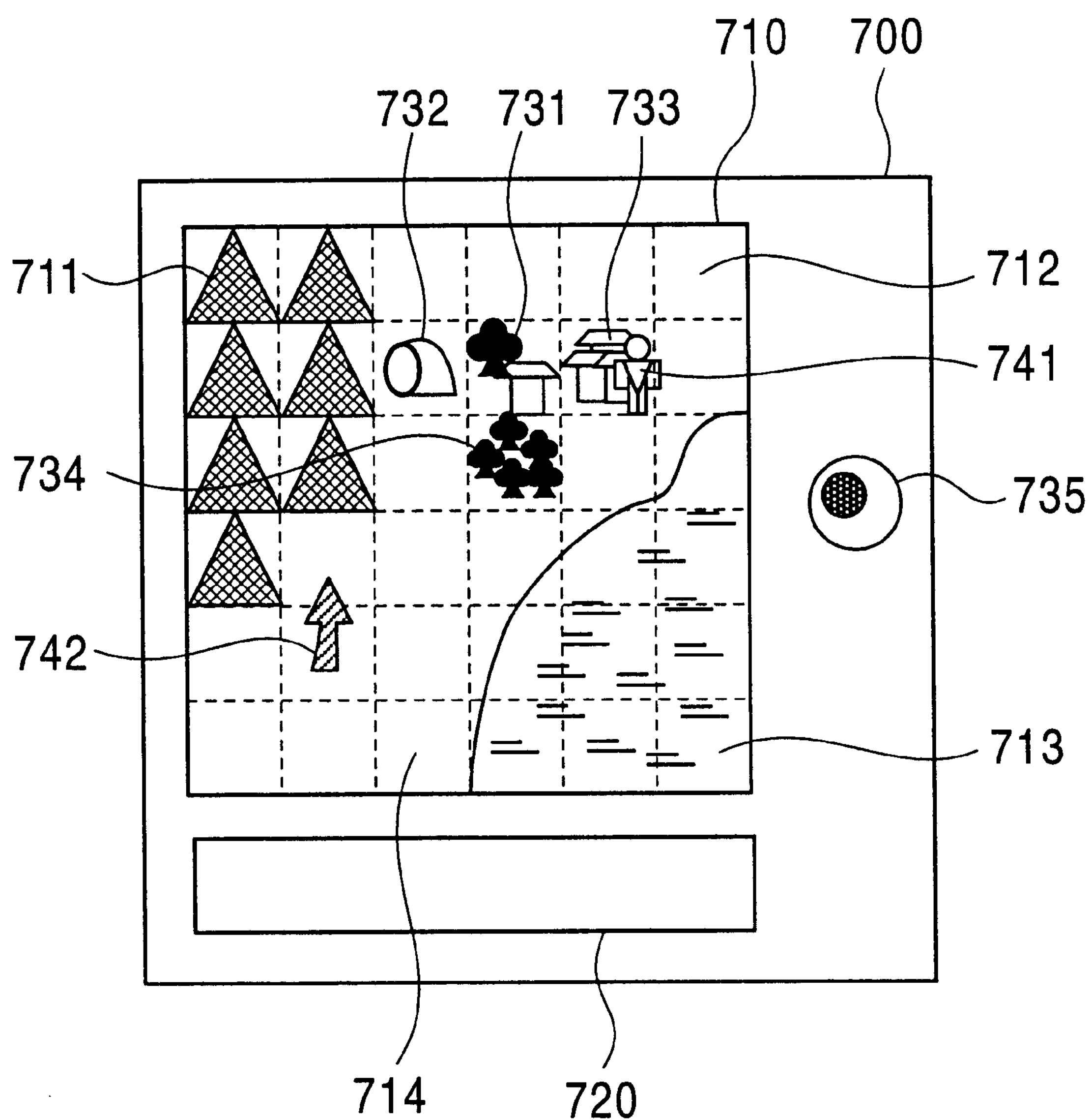
FIG. 19 is a diagram illustrating an example of screen display, according to the third embodiment.

FIG. 19 is an example of a world map displayed on the display screen 700 in step S503. With the third embodiment, the land display area of the world map is clipped and displayed on a world map display area 710 on the display screen 700 of the monitor display 105. Also, messages to the player are displayed in the message display area 720.

The world map in the world map display area 710 is sectioned off into a grid-like form, with each grid being equivalent to a map panel. In the third embodiment, 36 panels of 6 rows and 6 columns are displayed.

Of the map panels on the world map display area 710, there are map panels 711 wherein the terrain type is mountains, map panels 712 wherein the terrain type is plains, map panels 713 wherein the terrain type is ocean, and map panels 714 wherein the terrain type is seashore.

An image of mountains is drawn on the map panels 711 wherein the terrain type is mountains, an image of plains is drawn on the map panels 712 wherein the terrain type is plains, an image of the ocean is drawn on the map panels 713 wherein the terrain type is ocean, and an image of the seashore is drawn on the map panels 714 wherein the terrain type is seashore. Incidentally, the map panels wherein the terrain type is seashore are positioned next to the map panels wherein the terrain type is ocean.

Land icons 731, 732, 733, and 734 indicating lands such as structures are displayed on the map panels within the world map display area 710. Only one land is positioned on one map panel. Also, the main character 741 is displayed within the world map display area 710.

Displayed next to the world map display area 710 is an item 735 for causing lands to appear. Further, within the display screen 700 is displayed a cursor 742. The cursor 742 can be moved by pressing various buttons or keys on the controller 103.

Returning to FIG. 18, once the world map screen display processing is completed, the button operation detecting processing of the controller 103 is performed (step S504). In the event that the direction key 230 of the controller 103 is pressed, the moving processing of the cursor 742 is performed according to the direction in which the direction key is being pressed (step S505).

Specifically, the movement of the cursor in the direction indicated by the direction key is displayed on the display screen 700. Once the movement of the cursor 742 ends, the flow returns to the processing step S504.

In the event that judgement is made that the □ button 206 has been pressed in the processing in step S504, the cursor is moved to the position of the land placing item 735 (step S506). Then, judgement is made regarding whether or not the land placing item 735 has been selected (step 507)

With the third embodiment, in the event that the ○ button 204 is pressed in the state with the cursor 742 on the item 735, judgment is made that the item 735 displayed below the cursor 742 has been selected. Also, in the event that the x button 205 is selected, judgement is made that the item is not selected.

Figure 20:
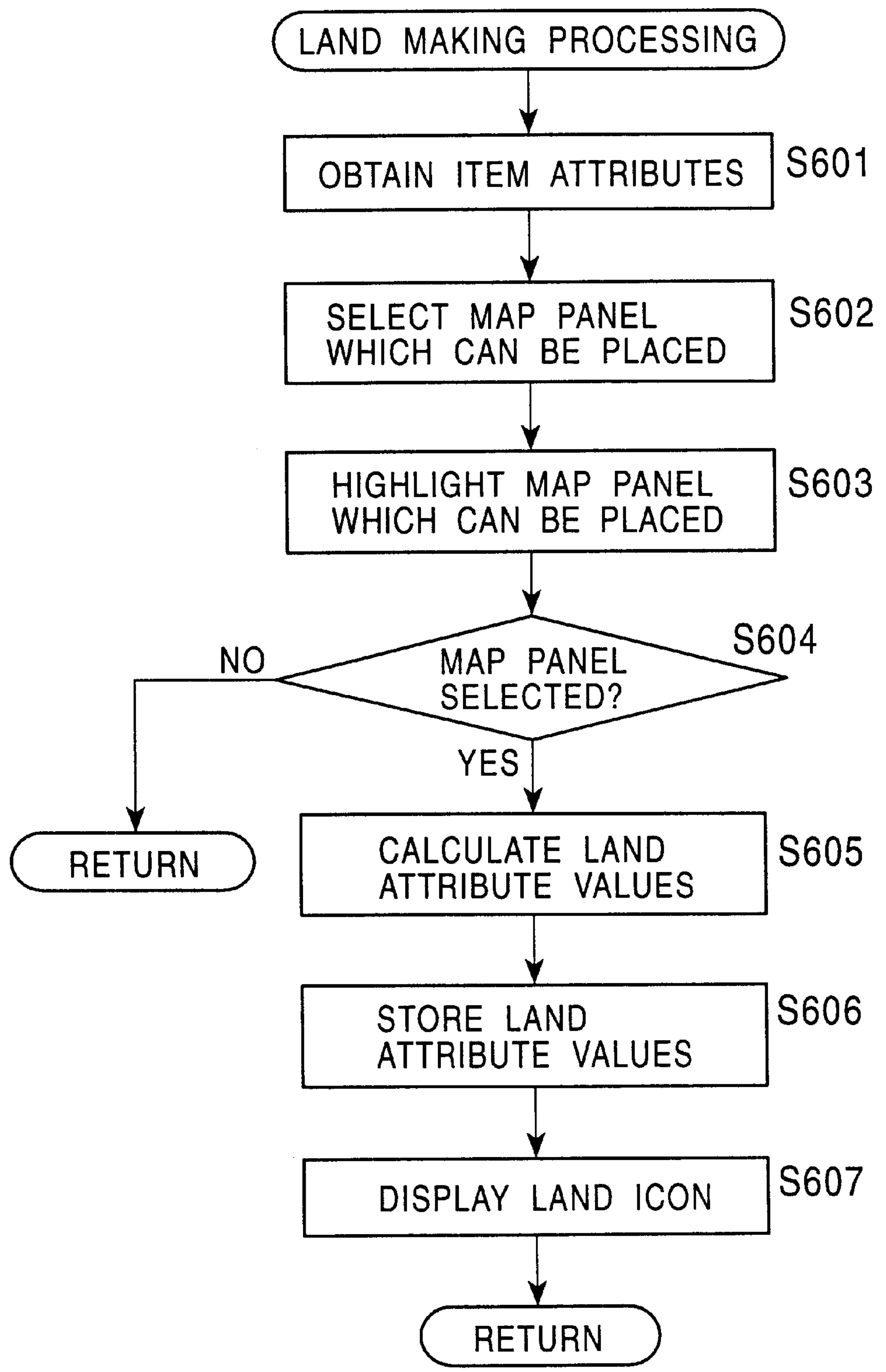
FIG. 20 is a flowchart illustrating exemplary land making processing procedures.

Once judgement is made that the item has been selected in the processing in step S507, the land making processing is executed (step S508). The processing procedures for the land making processing are shown in FIG. 20, with details described later. Once the land making processing is completed, the flow returns to the processing in step S504.

Figure 22:
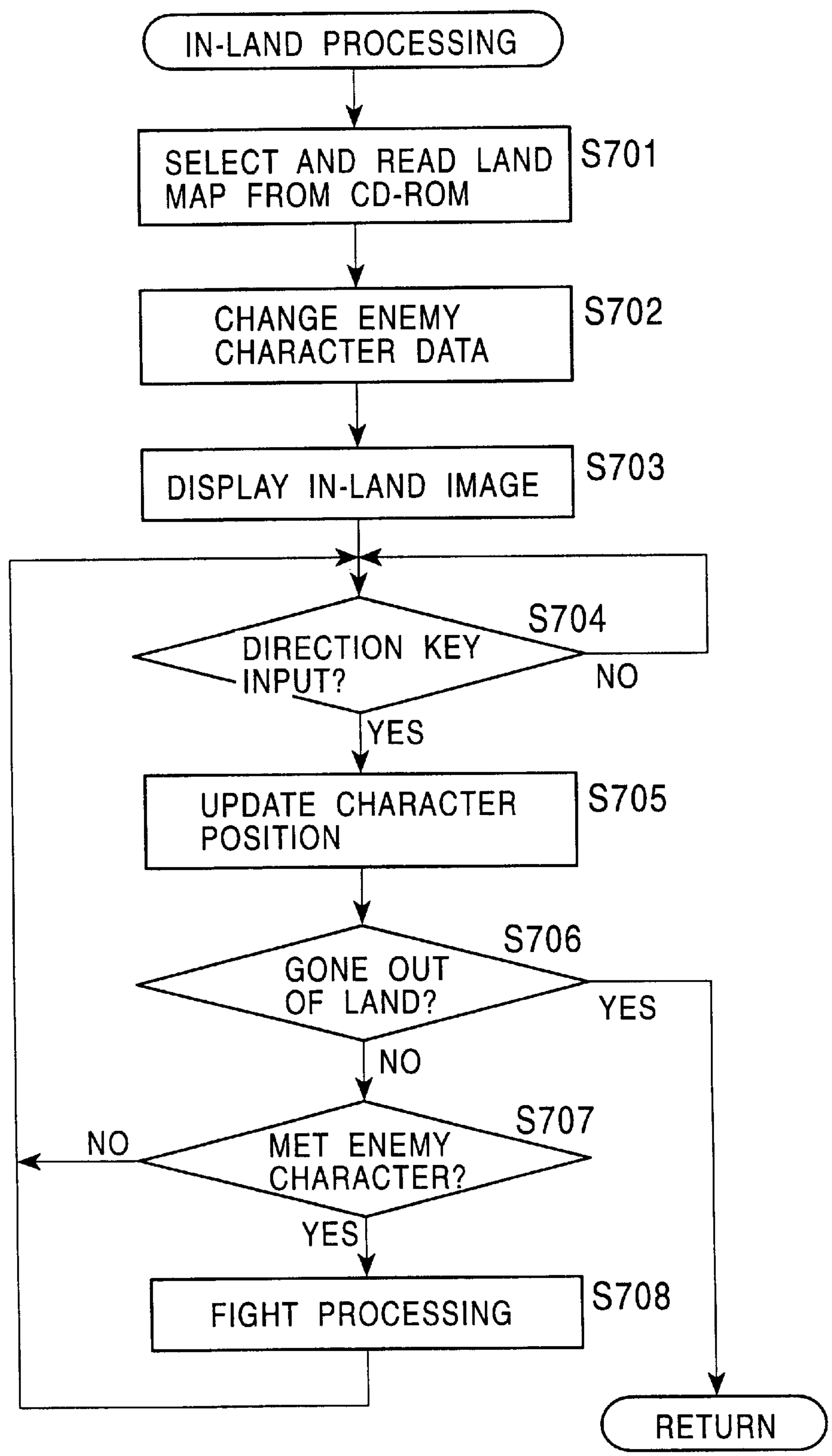
FIG. 22 is a flowchart illustrating exemplary in-land processing procedures.

In the event that judgement is made that the ○ button 204 has been pressed in the processing in step S504, judgement is made regarding whether or not there is land at the position of the cursor (step S509). In the event that judgement is made that there is land, the main character is moved to the position indicated by the cursor 742, and in-land processing is performed (step S510). The processing procedures for the in-land processing are shown in FIG. 22, with the details thereof being described later.

Once the in-land processing ends, worlds map information is read out from the CD-ROM (step S511), and the flow returns to step S503. Also, in the event that judgement is made that there is no land at the position of the cursor in the processing in step S509, the flow returns to the processing in step S504.

Next, the details of the land making processing will be described.

FIG. 20 is a flowchart illustrating example processing procedures for the land making processing.

First, the eight types of attribute values and usable terrain types for the item selected in step S507 of the main processing are obtained from the item area 406 of the main memory 304 (step S601).

Next, from each map panel within the world map, map panels capable of placing the item selected in step S507 are selected (step S602). With the present embodiment, map panels where land can be placed are determined according to the following conditions.

(A) That no land has been placed there yet.

(B) That land has been placed in one of the adjacent map panels.

(C) That the terrain type allows placement of the item.

That is, judgement is made regarding each of the map panels making up the world map whether or not the conditions (A), (B), and (C) are satisfied, and the judgement results for each are temporarily stored in the miscellaneous data area 407 within the main memory 304. Then, map panels regarding which judgment is passed that the conditions (A), (B), and (C) are satisfied are selected. However, condition (A) is not judged regarding the first item placed on the world map.

The judgement results can be represented with one bit for whether or not placement can be made, so a 6 by 6 bit string bit array is prepared in the miscellaneous data area 407 within the main memory 304, and the judgement results are represented by setting or clearing each bit in this array.

Next, reference is made to the bit string in the miscellaneous data area 407 which stores the judgement results from step S602, and map panels to which land placement can be made are highlighted (step S603). Input from the player is received in this state.

Next, judgement is made regarding whether or not the map panel for placement has been confirmed (step S604). The player pressing the direction key 203 of the controller 103 moves the cursor in the direction pressed. Pressing the ○ button 204 confirms the map panel which the cursor is currently at as the location for placement. Pressing the x button 205 results in judgement that "cancel" has been invoked.

In the event that the map panel for placement is not decided and "cancel" has been confirmed (step S604; NO), the present processing is quit and the flow returns to the main processing.

On the other hand, in the event that any map panel has been confirmed (step S604; YES), the item selected in step S507 (see FIG. 18) is placed in that map panel. Then, at the position where the item has been placed, a land set with events for causing progressing of the game appears on the world map.

Now, the attribute values of the land appearing by the item changing (hereafter referred to as "land attributes") are calculated (step S605). Calculation of the land attribute values is performed as described below.

First, the attribute values set to the item originating from the land are obtained by the item table, and set as the initial values of the land attribute values. Next, the attribute values of the lands placed around the newly-appearing land are calculated for each attribute, to total for each attribute is divided by two, and truncated at the decimal point. The values for each attribute obtained as a result are added to the attribute values of each attribute of the appearing land.

Further, the attributes data of the map panel to which the land has been placed are obtained from the terrain data area 404 within the main memory 304. The attributes data of each map panel is set by the terrain data table 920 (see FIG. 16). The obtained values of the eight types of attributes are added to the attribute values for each attribute in the appearing land. At this time, in the event that the attribute value becomes a value of 4 or greater, this is corrected to 3. In other words, the maximum value for land attributes is 3.

Next, updating processing for attribute values of lands already placed around the newly appearing land is performed. Specifically, the attribute values for each attribute of the placed item are added to the attribute values of the surrounding lands. At this time, in the event that the attribute value becomes a value of 4 or greater, this is corrected to 3.

Thus, the attribute values for the eight attributes for the appearing land and the surrounding lands are calculated. The calculated values are stored in the terrain data area 404 within the main memory 304, as a land table (step S606).

FIG. 21 illustrates an example of the land table 940 stored in the terrain data area 404. Provided in the land table 940 are the setting items of land No., land name, attributes data, map panel to which the land is placed, and order of placement.

Set to the land No. is a No. provided to the land placed on the world map.

Set to the land name is a land name corresponding to the land No. With the example shown in FIG. 21, the name "cave of fossils" is set to the land No. "No. 1".

Set to the attributes data are the attribute values provided to the corresponding land, for each of the eight attributes, "fire", "water", "earth", "wind", "light", "darkness", "metal", and wood. With the example shown in FIG. 21, the land with the name "cave of fossils" has 3 set to the "water" attributes value, 1 set to the "earth" attributes value, 2 set to the "light" attributes value, 2 set to the "darkness" attributes value, and 1 set to the "wood" attributes value. All other attributes values are zero.

Set to the map panel for placement is the No. of the map panels where each land is placed. With the example shown in FIG. 21, the "cave of fossils" is set to the No. 4 map panel.

Set to the placement order is the order in which the land was placed on the world map. With the example shown in FIG. 21, the "cave of fossils" is No. 3 in order of placement.

Returning to FIG. 20, following storing the land attribute values, an icon representing the emerging land is superimposed on the selected map panel (step S607). Then, the land making processing ends, and the flow returns to menu processing.

Next, description will be made regarding the details of in-land processing of step S510 in FIG. 18.

FIG. 22 is a flowchart illustrating the processing procedures of in-land processing. First, the data of characters corresponding to the lands specified by operation input is read out of the CD-ROM mounted on the CD-ROM drive 313 (step S701)

The character data which has been read out is stored in the character data area 402. Also, the map data within that land is read out from the CD-ROM, and is stored in the map data area 403.

Next, the changing processing for the enemy character data is performed (step S702). The changing processing is performed as follows.

First, the level reference value of the land is calculated. The level reference value is obtained by adding the distance from the first land (base land) to the object land, to the order in which the object land has appeared. The distance between the object land and the base land, is the total of the difference in rows between the two and the difference in columns between the two.

The basic level of the enemy character is determined based on this level reference value. The basic level is determined based on the level correlating relation table 915 (see FIG. 15). For example, in the event that the level reference value is "4", the reference level is "3".

Once the reference level has been obtained, the following expression is calculated.

$$\text{Reference level}\times(\text{total of strengthening attribute values}-\text{total of weakening attribute values})=\alpha \quad (1)$$

Now, the total of strengthening attribute values is defined as the total of attribute values set as attribute values for strengthening enemy characters by the character table 910 (see FIG. 14), of the attribute values of the land where processing is being performed.

Also, the total of weakening attribute values is defined as the total of attribute values set as attribute values for weakening enemy characters by the character table 910, of the attribute values of the selected land.

For example, in the event that the enemy character "monster A" appears in the "cave of fossils", it can be judged from the character table 910 (see FIG. 14) that the strengthening attributes for the "monster A" are "fire" and "earth", and the weakening attributes are "water" and "wind".

Accordingly, the land table 940 (see FIG. 21) is used to obtain the attribute values for "fire", "earth", "water", and "wind" are obtained for the "cave of fossils". In the example shown in FIG. 21, the "cave of fossils" has 0 set to the "fire" attributes value, 1 set to the "earth" attributes value, 3 set to the "water" attributes value, and 0 set to the "wind" attributes value. These values are used to carry out the Expression (1).

The value obtained by taking the value a calculated in Expression (1) and truncating at the decimal point becomes the actual level in the event that the enemy character appears. Once the level is obtained, the actual capability values are calculated using the capability value data and capability increase data in the character table 910 (see FIG. 14).

The capability values of the character at the actual time of appearing is calculated with the following expression.

$$\text{Capability values when appearing}=\text{capability value data}+\text{capability increasing data}\times\text{level} \quad (2)$$

This calculation is performed for each of "endurance", "attack", and "defense". Thus, the capability values are changed such that the higher the level is, the more the capabilities values of the enemy characters increase.

Once the capability values of the enemy characters have been changed, an image within the land is displayed (Step S703). At this time, the main character is displayed at a position within the background image set as the entrance to the land. Once the image within the land is displayed, judgement is made whether or not the direction key has been pressed (step S704). In the event that there has been no pressing input of the direction key, the processing of step S704 is repeated.

Once pressing of the direction key is detected in step S704, the main character is moved according to the direction in which the direction key was pressed (step S705). When the main character moves, judgement is made regarding whether or not the main character has gone out of the land (step S706). That is, there is a position within the land predetermined as the exit from the land, and in the event that the main character moves to that position, judgement is made that the main character has gone out of the land, and the in-land processing ends. Once the in-land processing ends, the flow returns to the main processing.

In the event that judgement is made that the main character has not gone out of the land in step S706, judgement is made whether or not the main character has met with an enemy character placed within the land beforehand (step S707). In the event that the main character and the enemy character come within a certain distance of each other, judgement is made that the two have met, and a fight commences (step S708). The capability values of the enemy character at the time of fighting are the capability values calculated with the processing in step S702. Once the fight processing ends, the flow returns to the processing in step S704.

Also, in the event that judgment is made in the processing in step S707 that the main character has not met the enemy character, the flow returns to the processing in step S704.

Thus, according to the third embodiment, the player can place lands arbitrarily on the world map. Further, the capabilities of enemy characters placed in the field maps can also be changed according to the location where they are placed.

Also according to the third embodiment, strengthening attributes and weakening attributes are provided to the enemy characters. Accordingly, the level of enemy characters is determined by the land placement states, but even in the event that the level is the same, the amount of increase in capability values of each enemy character differs. Accordingly, the player can place lands such that the capability values of enemy characters which are powerful enemies in comparison with the capability values of the main character do not increase too much, and thus can proceed with the game in an advantageous manner.

Now, in order to facilitate description of an example of the game apparatus to which the present invention is applied, description has been made with reference to a home video game apparatus wherein game programs are read in from an information recording medium, but application of the present invention is by no means restricted to such home video games; rather, general-purpose computers, game apparatuses with programs built-in, etc., may be used as well. Cellular telephones, portable information terminals such as palmtops, car navigation systems, etc., may be used as applicable platforms, as well.

Also, though a CD-ROM (Compact Disk Read-Only Memory) has been used as an example of the information recording medium to which the present invention is applied in order to facilitate description, the information recording medium to which the present invention is applied is by no means restricted to CD-ROMs; rather memory cards, floppy disks, hard disks, magneto-optical disks, cassette tapes, etc., may be used as well.

Further, endurance, attack, and defense have been listed as examples of character data, but the present invention is by no means restricted to such; rather, this may include messages issued by the character, form or type of actions taken by the character, type of special effects used for displaying the character on the screen, etc., as character data.

Also, though fighting between the main character and an enemy character has been given as an example of interaction between the main character and other characters, the present invention is by no means restricted to such; rather, conversation with other characters, providing information, selling or buying items to or from other characters such as weapons, protective items, books of magic spells, maps, and other such items, may be applied to the present invention as well.

According to the present invention, items indicating the position at which an event is to occur are placed according to operating input, and the contents of the event are determined by the positional relation between the placed items. Accordingly, the contents of events occurring during the progression of the game can be changed according to arbitrary settings by the player, thereby continuing to draw the player's interest.

The present disclosure relates to subject matter contained in Japanese Patent Application Nos. HEI 10-337641, filed on Nov. 27, 1998, and HEI 11-279660, filed on Sep. 30, 1999, the contents of both of which are herein expressly incorporated in their entireties.

What is claimed is:

1. A game control progression method for a video game having a world map and a plurality of field maps that are correlated with positions within the world map, comprising:

placing items on the world map in which a player character can be moved, in response to operation input;

storing positional information indicating the position where each item was positioned within said world map each time one of the items is positioned; and determining lands, each having a field map in which the player character can move and fight, based upon the positional information and the placed items.

2. The game progression control method according to claim 1, wherein said determining of lands further comprises determining values indicating fighting capabilities of enemy characters in the field map of the land, during a fight event between the player character and the enemy characters.

3. The game progression control method according to claim 1, wherein said determining of lands further comprises determining based upon data of other lands adjacent to said item.

4. The game progression control method according to claim 1, wherein said storing of positional information further comprises storing positional information of where each item has been placed on the world map along with an order of placement thereof each time one of the items is placed.

5. The game control progression method according to claim 1, further comprising replacing images of the items placed on the world map with images indicating the lands.

6. The game control progression method according to claim 1, further comprising:

moving the player character within the world map in response to operation input; and displaying, when the player character moves to one of the lands on the world map, an image of the field map of the land where the player character has moved.

7. A computer program embodied on a computer-readable storage medium for controlling game progression of a video game having a world map and a plurality of field maps that are correlated with positions within the world map, said program comprising:

placing items on the world map in which a player character can be moved, in response to operation input;

storing positional information describing the position where each item was positioned within said world map each time one of the items is positioned;

determining lands, each having a field map in which the player character can move and fight, based upon the positional information and the placed items.

8. The computer program according to claim 5, wherein said determining of lands further comprises determining values indicating fighting capabilities of enemy characters in the field map of the land, during a fight event between the player character and the enemy characters.

9. The computer program according to claim 7, wherein said determining of lands further comprises determining based upon data of other lands adjacent to said item.

10. The computer program according to claim 7, wherein said storing of positional information further comprises storing positional information describing the position where each item has been placed on the world map along with an order of placement thereof each time one of the items is placed.

11. The game progression control program according to claim 7, further comprising replacing images of the items placed on the world map with images indicating the lands.

12. The game progression control program according to claim further comprising:

moving the player character within the world map in response to operation input; and displaying, when the player character moves to one of the lands on the world map, an image of the field map of the land where the player character has moved.

13. A game apparatus, comprising:

a computer for controlling game progression; and a storage medium recording programs for controlling game progression of a video game with said computer, the video game having a world map and a plurality of field maps that are correlated with positions within the world map, wherein said programs cause a computer to perform the following:

placing items on the world map in which a player character can be moved, in response to operation input;

storing positional information of the position where each item was positioned within said world map each time one of the items is positioned; and determining lands, each having a field map in which the player character can move and fight, based upon the positional information and the placed items.

14. The game apparatus according to claim 13, in which the program further causes the computer to replace images of the items placed on the world map with images indicating the lands.

15. The game apparatus according to claim 13, in which the program further causes the computer to:

move the player character within the world map in response to operation input; and display, when the player character moves to one of the lands on the world map, an image of the field map of the land where the player character has moved.

* * * * *

UNITED STATES PATENT AND TRADEMARK OFFICE

CERTIFICATE OF CORRECTION

PATENT NO. : 6,656,051 B2
DATED : December 2, 2003
INVENTOR(S) : K. Ishii et al.

It is certified that error appears in the above-identified patent and that said Letters Patent is hereby corrected as shown below:

Column 20,
Line 14, "claim 5" should be -- claim 7 --.
Line 32, after "claim" insert -- 7, --.

Signed and Sealed this

Seventeenth Day of August, 2004

JON W. DUDAS
*Acting Director of the United States Patent and Trademark Office*